(12) United States Patent
Yoon et al.

(10) Patent No.: US 8,559,377 B2
(45) Date of Patent: Oct. 15, 2013

(54) JOINT ORTHOGONAL FREQUENCY-DIVISION MULTIPLEXING (OFDM) AND MULTI-CARRIER CODE DIVISION MULTIPLE ACCESS (MC-CDMA) TRANSMISSION AND FAST CELL SWITCHING FOR CIRCUIT SWITCHING TRAFFIC

(75) Inventors: Young C. Yoon, San Diego, CA (US); Li-Hsiang Sun, San Diego, CA (US); Suk Woo Lee, San Diego, CA (US)

(73) Assignee: LG Electronics Inc., Seoul (KR)

( * ) Notice: Subject to any disclaimer, the term of this patent is extended or adjusted under 35 U.S.C. 154(b) by 378 days.

(21) Appl. No.: 11/671,731

(22) Filed: Feb. 6, 2007

(65) Prior Publication Data

US 2007/0201438 A1     Aug. 30, 2007

Related U.S. Application Data

(60) Provisional application No. 60/765,860, filed on Feb. 6, 2006, provisional application No. 60/785,418, filed on Mar. 24, 2006.

(51) Int. Cl.
*H04W 4/00* (2009.01)
*H04B 7/216* (2006.01)

(52) U.S. Cl.
USPC ............................ 370/329; 370/335; 370/342

(58) Field of Classification Search
None
See application file for complete search history.

(56) References Cited

U.S. PATENT DOCUMENTS

| | | | |
|---|---|---|---|
| 6,064,662 A | 5/2000 | Gitlin et al. | |
| 6,975,604 B1* | 12/2005 | Ishida et al. | 370/331 |
| 7,065,359 B2* | 6/2006 | Chuah et al. | 455/436 |
| 7,391,715 B2* | 6/2008 | Lee et al. | 370/208 |
| 7,457,588 B2* | 11/2008 | Love et al. | 455/67.11 |
| 7,616,696 B1* | 11/2009 | Mansour et al. | 375/260 |
| 2003/0112744 A1* | 6/2003 | Baum et al. | 370/206 |
| 2004/0001429 A1* | 1/2004 | Ma et al. | 370/210 |
| 2004/0141481 A1 | 7/2004 | Lee et al. | |
| 2005/0094675 A1* | 5/2005 | Bhushan et al. | 370/527 |
| 2006/0029021 A1* | 2/2006 | Sakawa et al. | 370/331 |
| 2006/0050664 A1* | 3/2006 | Guey | 370/329 |
| 2006/0203924 A1* | 9/2006 | Casaccia et al. | 375/260 |
| 2006/0268783 A1* | 11/2006 | Julian et al. | 370/331 |
| 2006/0268786 A1* | 11/2006 | Das et al. | 370/335 |
| 2007/0064641 A1* | 3/2007 | Laroia et al. | 370/320 |
| 2007/0153729 A1* | 7/2007 | Alapuranen | 370/329 |

FOREIGN PATENT DOCUMENTS

| | | |
|---|---|---|
| CN | 1518803 | 8/2004 |
| EP | 0633671 | 5/1994 |
| EP | 1005190 | 5/2000 |

(Continued)

OTHER PUBLICATIONS

European Patent Office Application Serial No. 07708774.0, Search Report dated Feb. 5, 2013, 7 pages.

(Continued)

*Primary Examiner* — Marcus R Smith
(74) *Attorney, Agent, or Firm* — Lee, Hong, Degerman, Kang & Waimey

(57) ABSTRACT

A method and apparatus for transmission to support various QoS requirements and various channel conditions is provided. By staggering the transmission of data sub packets and partitioning discrete tones used for transmission, a plurality of users may be provided with a plurality of multiple access techniques.

14 Claims, 25 Drawing Sheets

| MC-CDMA | MC-CDMA | MC-CDMA | MC-CDMA | MC-CDMA | MC-CDMA | MC-CDMA | MC-CDMA |
|---|---|---|---|---|---|---|---|
| MC-CDMA | MC-CDMA | MC-CDMA | MC-CDMA | MC-CDMA | MC-CDMA | MC-CDMA | MC-CDMA |
| MC-CDMA | MC-CDMA | MC-CDMA | MC-CDMA | MC-CDMA | MC-CDMA | MC-CDMA | MC-CDMA |
| MC-CDMA | MC-CDMA | MC-CDMA | MC-CDMA | MC-CDMA | MC-CDMA | MC-CDMA | MC-CDMA |
| OFDM | OFDM | OFDM | OFDM | OFDM | OFDM | OFDM | OFDM |
| OFDM | OFDM | OFDM | OFDM | OFDM | OFDM | OFDM | OFDM |
| OFDM | OFDM | OFDM | OFDM | OFDM | OFDM | OFDM | OFDM |
| OFDM | OFDM | OFDM | OFDM | OFDM | OFDM | OFDM | OFDM |
| MC-CDMA | MC-CDMA | MC-CDMA | MC-CDMA | MC-CDMA | MC-CDMA | MC-CDMA | MC-CDMA |
| MC-CDMA | MC-CDMA | MC-CDMA | MC-CDMA | MC-CDMA | MC-CDMA | MC-CDMA | MC-CDMA |
| MC-CDMA | MC-CDMA | MC-CDMA | MC-CDMA | MC-CDMA | MC-CDMA | MC-CDMA | MC-CDMA |
| MC-CDMA | MC-CDMA | MC-CDMA | MC-CDMA | MC-CDMA | MC-CDMA | MC-CDMA | MC-CDMA |
| OFDM | OFDM | OFDM | OFDM | OFDM | OFDM | OFDM | OFDM |
| OFDM | OFDM | OFDM | OFDM | OFDM | OFDM | OFDM | OFDM |
| OFDM | OFDM | OFDM | OFDM | OFDM | OFDM | OFDM | OFDM |
| OFDM | OFDM | OFDM | OFDM | OFDM | OFDM | OFDM | OFDM |

(56) References Cited

FOREIGN PATENT DOCUMENTS

| | | |
|---|---|---|
| EP | 1357695 | 10/2003 |
| EP | 1388954 | 2/2004 |
| EP | 1246385 | 11/2006 |
| JP | 9036916 | 2/1997 |
| JP | 2004158901 | 6/2004 |
| WO | 2005/043844 | 5/2005 |
| WO | 2005/122497 | 12/2005 |
| WO | 2006000991 | 1/2006 |

OTHER PUBLICATIONS

The State Intellectual Property Office of the People's Republic of China Application Serial No. 200780004625.3, Office Action dated Nov. 12, 2012, 5 pages.

The State Intellectual Property Office of the People's Republic of China Application Serial No. 200780004625.3, Office Action dated Apr. 15, 2013, 6 pages.

\* cited by examiner

CDMA SPREADING AND DESPREADING

CDMA SPREADING AND DESPREADING USING MULTIPLE SPREADING SEQUENCES

CDMA REVERSE POWER CONTROL

CDMA RAKE RECEIVER

CDMA 2000 CALL PROCESSING OVERVIEW

CDMA 2000 INITIALIZATION STATE

SYSTEM ACCESS STATE

CDMA 2000 MOBILE TRAFFIC CHANNEL STATE

CDMA 2000 MULTIPLEXING AND QoS CONTROL SUBLAYER TRANSMITTING FUNCTION

FIG. 11
COMPARISON OF CDMA2000 FOR 1x AND 1xEV-DO
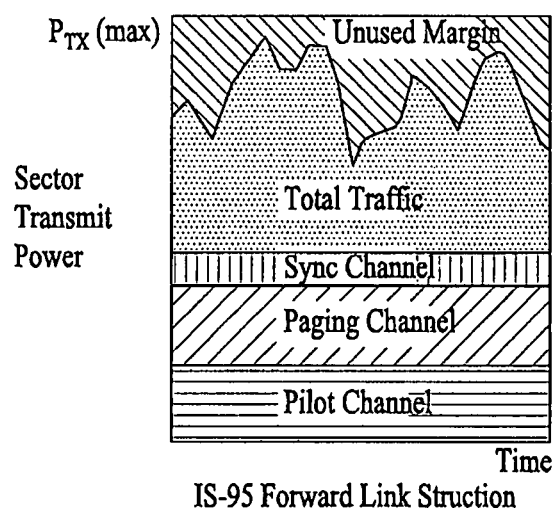
IS-95 Forward Link Struction
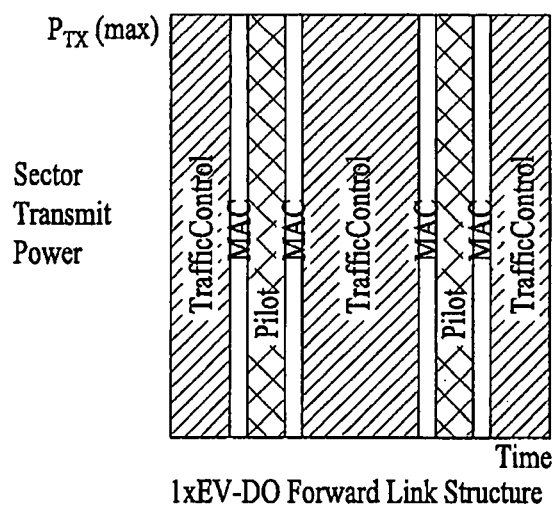
1xEV-DO Forward Link Structure 1xEV-DO NETWORK ARCHITECTURE 1xEV-DO PHYSICAL LAYER CHANNELS

1xEV-DO DEFAULT PROTOCOL

1xEV-DO NON-DEFAULT PROTOCOL

1xEV-DO CONNECTION LAYER PROTOCOLS

1xEV-DO ACK/NAK OPERATION

| OFDM | OFDM | OFDM | OFDM | OFDM | OFDM |
|---|---|---|---|---|---|
| OFDM | OFDM | OFDM | OFDM | OFDM | OFDM |
| OFDM | OFDM | OFDM | OFDM | OFDM | OFDM |
| OFDM | OFDM | OFDM | OFDM | OFDM | OFDM |
| OFDM | OFDM | OFDM | OFDM | OFDM | OFDM |
| OFDM | OFDM | OFDM | OFDM | OFDM | OFDM |
| OFDM | OFDM | OFDM | OFDM | OFDM | OFDM |
| OFDM | OFDM | OFDM | OFDM | OFDM | OFDM |
| OFDM | OFDM | OFDM | OFDM | OFDM | OFDM |
| OFDM | OFDM | OFDM | OFDM | OFDM | OFDM |
| OFDM | OFDM | OFDM | OFDM | OFDM | OFDM |
| OFDM | OFDM | OFDM | OFDM | OFDM | OFDM |
| OFDM | OFDM | OFDM | OFDM | OFDM | OFDM |
| OFDM | OFDM | OFDM | OFDM | OFDM | OFDM |
| OFDM | OFDM | OFDM | OFDM | OFDM | OFDM |
| OFDM | OFDM | OFDM | OFDM | OFDM | OFDM |
| OFDM | OFDM | OFDM | OFDM | OFDM | OFDM |

FIG. 21

| MC-CDMA | MC-CDMA | MC-CDMA | MC-CDMA | MC-CDMA | MC-CDMA | MC-CDMA | MC-CDMA | MC-CDMA | MC-CDMA | MC-CDMA | MC-CDMA | MC-CDMA | MC-CDMA | MC-CDMA | MC-CDMA |
|---|---|---|---|---|---|---|---|---|---|---|---|---|---|---|---|
| MC-CDMA | MC-CDMA | MC-CDMA | MC-CDMA | MC-CDMA | MC-CDMA | MC-CDMA | MC-CDMA | MC-CDMA | MC-CDMA | MC-CDMA | MC-CDMA | MC-CDMA | MC-CDMA | MC-CDMA | MC-CDMA |
| MC-CDMA | MC-CDMA | MC-CDMA | MC-CDMA | MC-CDMA | MC-CDMA | MC-CDMA | MC-CDMA | MC-CDMA | MC-CDMA | MC-CDMA | MC-CDMA | MC-CDMA | MC-CDMA | MC-CDMA | MC-CDMA |
| MC-CDMA | MC-CDMA | MC-CDMA | MC-CDMA | MC-CDMA | MC-CDMA | MC-CDMA | MC-CDMA | MC-CDMA | MC-CDMA | MC-CDMA | MC-CDMA | MC-CDMA | MC-CDMA | MC-CDMA | MC-CDMA |
| OFDM | OFDM | OFDM | OFDM | OFDM | OFDM | OFDM | OFDM | OFDM | OFDM | OFDM | OFDM | OFDM | OFDM | OFDM | OFDM |
| OFDM | OFDM | OFDM | OFDM | OFDM | OFDM | OFDM | OFDM | OFDM | OFDM | OFDM | OFDM | OFDM | OFDM | OFDM | OFDM |
| OFDM | OFDM | OFDM | OFDM | OFDM | OFDM | OFDM | OFDM | OFDM | OFDM | OFDM | OFDM | OFDM | OFDM | OFDM | OFDM |
| OFDM | OFDM | OFDM | OFDM | OFDM | OFDM | OFDM | OFDM | OFDM | OFDM | OFDM | OFDM | OFDM | OFDM | OFDM | OFDM |
| MC-CDMA | MC-CDMA | MC-CDMA | MC-CDMA | MC-CDMA | MC-CDMA | MC-CDMA | MC-CDMA | MC-CDMA | MC-CDMA | MC-CDMA | MC-CDMA | MC-CDMA | MC-CDMA | MC-CDMA | MC-CDMA |
| MC-CDMA | MC-CDMA | MC-CDMA | MC-CDMA | MC-CDMA | MC-CDMA | MC-CDMA | MC-CDMA | MC-CDMA | MC-CDMA | MC-CDMA | MC-CDMA | MC-CDMA | MC-CDMA | MC-CDMA | MC-CDMA |
| MC-CDMA | MC-CDMA | MC-CDMA | MC-CDMA | MC-CDMA | MC-CDMA | MC-CDMA | MC-CDMA | MC-CDMA | MC-CDMA | MC-CDMA | MC-CDMA | MC-CDMA | MC-CDMA | MC-CDMA | MC-CDMA |
| MC-CDMA | MC-CDMA | MC-CDMA | MC-CDMA | MC-CDMA | MC-CDMA | MC-CDMA | MC-CDMA | MC-CDMA | MC-CDMA | MC-CDMA | MC-CDMA | MC-CDMA | MC-CDMA | MC-CDMA | MC-CDMA |
| OFDM | OFDM | OFDM | OFDM | OFDM | OFDM | OFDM | OFDM | OFDM | OFDM | OFDM | OFDM | OFDM | OFDM | OFDM | OFDM |
| OFDM | OFDM | OFDM | OFDM | OFDM | OFDM | OFDM | OFDM | OFDM | OFDM | OFDM | OFDM | OFDM | OFDM | OFDM | OFDM |
| OFDM | OFDM | OFDM | OFDM | OFDM | OFDM | OFDM | OFDM | OFDM | OFDM | OFDM | OFDM | OFDM | OFDM | OFDM | OFDM |
| OFDM | OFDM | OFDM | OFDM | OFDM | OFDM | OFDM | OFDM | OFDM | OFDM | OFDM | OFDM | OFDM | OFDM | OFDM | OFDM |

FIG. 22

| MC-CDMA | MC-CDMA | MC-CDMA | MC-CDMA | MC-CDMA | MC-CDMA | MC-CDMA | MC-CDMA |
|---|---|---|---|---|---|---|---|
| OFDM | OFDM | OFDM | OFDM | OFDM | OFDM | OFDM | OFDM |
| OFDM | OFDM | OFDM | OFDM | OFDM | OFDM | OFDM | OFDM |
| OFDM | OFDM | OFDM | OFDM | OFDM | OFDM | OFDM | OFDM |
| OFDM | OFDM | OFDM | OFDM | OFDM | OFDM | OFDM | OFDM |
| OFDM | OFDM | OFDM | OFDM | OFDM | OFDM | OFDM | OFDM |
| OFDM | OFDM | OFDM | OFDM | OFDM | OFDM | OFDM | OFDM |
| OFDM | OFDM | OFDM | OFDM | OFDM | OFDM | OFDM | OFDM |
| MC-CDMA | MC-CDMA | MC-CDMA | MC-CDMA | MC-CDMA | MC-CDMA | MC-CDMA | MC-CDMA |
| OFDM | OFDM | OFDM | OFDM | OFDM | OFDM | OFDM | OFDM |
| OFDM | OFDM | OFDM | OFDM | OFDM | OFDM | OFDM | OFDM |
| OFDM | OFDM | OFDM | OFDM | OFDM | OFDM | OFDM | OFDM |
| OFDM | OFDM | OFDM | OFDM | OFDM | OFDM | OFDM | OFDM |
| OFDM | OFDM | OFDM | OFDM | OFDM | OFDM | OFDM | OFDM |
| OFDM | OFDM | OFDM | OFDM | OFDM | OFDM | OFDM | OFDM |
| OFDM | OFDM | OFDM | OFDM | OFDM | OFDM | OFDM | OFDM |

FIG. 23

| MC-CDMA | MC-CDMA | OFDM | OFDM | MC-CDMA | MC-CDMA | OFDM |
|---------|---------|------|------|---------|---------|------|
| MC-CDMA | MC-CDMA | OFDM | OFDM | MC-CDMA | MC-CDMA | OFDM |
| OFDM | OFDM | OFDM | OFDM | MC-CDMA | OFDM | OFDM |
| OFDM | OFDM | OFDM | OFDM | MC-CDMA | OFDM | OFDM |
| OFDM | OFDM | OFDM | OFDM | OFDM | OFDM | OFDM |
| OFDM | OFDM | OFDM | OFDM | OFDM | OFDM | OFDM |
| OFDM | OFDM | OFDM | OFDM | MC-CDMA | OFDM | OFDM |
| OFDM | OFDM | OFDM | OFDM | MC-CDMA | OFDM | OFDM |
| OFDM | OFDM | OFDM | OFDM | MC-CDMA | OFDM | OFDM |
| OFDM | OFDM | OFDM | OFDM | MC-CDMA | OFDM | OFDM |
| OFDM | OFDM | OFDM | OFDM | MC-CDMA | OFDM | OFDM |
| OFDM | OFDM | OFDM | OFDM | MC-CDMA | OFDM | OFDM |
| OFDM | OFDM | OFDM | OFDM | MC-CDMA | OFDM | OFDM |
| MC-CDMA | MC-CDMA | OFDM | OFDM | MC-CDMA | OFDM | OFDM |
| MC-CDMA | MC-CDMA | OFDM | OFDM | MC-CDMA | OFDM | OFDM |
| OFDM | OFDM | OFDM | OFDM | OFDM | OFDM | OFDM |
| OFDM | OFDM | OFDM | OFDM | OFDM | OFDM | OFDM |

FIG. 24

| | |
|---|---|
| | |
| | |
| | |
| S10 | R12 |
| | |
| | |
| | |
| | |
| S02 | R11 |
| | |
| | |
| | |
| S01 | R10 |
| | |
| | |
| | |
| S00 | R02 |

MOBILE STATION/ACCESS TERMINAL

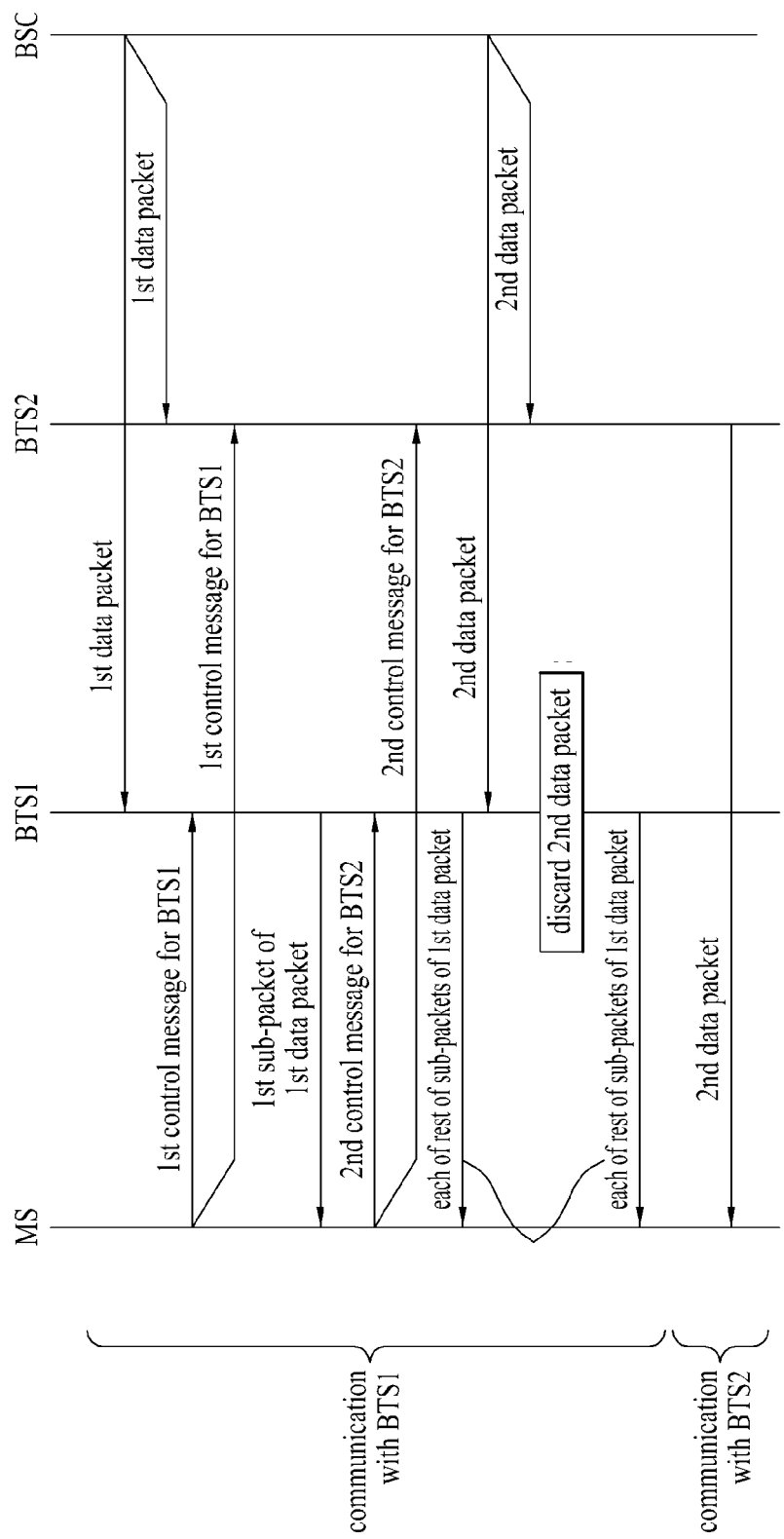

JOINT ORTHOGONAL FREQUENCY-DIVISION MULTIPLEXING (OFDM) AND MULTI-CARRIER CODE DIVISION MULTIPLE ACCESS (MC-CDMA) TRANSMISSION AND FAST CELL SWITCHING FOR CIRCUIT SWITCHING TRAFFIC

CROSS-REFERENCE TO RELATED APPLICATIONS

Pursuant to 35 U.S.C. §119(a), this application claims the benefit of U.S. Provisional Application Ser. No. 60/765,860 filed on Feb. 6, 2006 and U.S. Provisional Application Ser. No. 60/785,418 filed on Mar. 24, 2006, the contents of which are hereby incorporated by reference herein in their entirety.

FIELD OF THE INVENTION

The present invention relates to a method and apparatus for transmission to support varies QoS requirements and varies channel conditions. Specifically, the present invention is directed to multiple access design of cellular communication systems supporting multiple users that are based on some combination of OFDM, OFDMA, Single-carrier FDMA and/ or MC-CDMA or any system using discrete tones or sinusoids as its underlying mode of transmission.

DESCRIPTION OF THE RELATED ART

In the world of cellular telecommunications, those skilled in the art often use the terms 1G, 2G, and 3G. The terms refer to the generation of the cellular technology used. 1G refers to the first generation, 2G to the second generation, and 3G to the third generation.

1G refers to the analog phone system, known as an AMPS (Advanced Mobile Phone Service) phone systems. 2G is commonly used to refer to the digital cellular systems that are prevalent throughout the world, and include CDMAOne, Global System for Mobile communications (GSM), and Time Division Multiple Access (TDMA). 2G systems can support a greater number of users in a dense area than can 1G systems.

3G commonly refers to the digital cellular systems currently being deployed. These 3G communication systems are conceptually similar to each other with some significant differences.

Referring to FIG. 1, a wireless communication network architectures is illustrated. A subscriber uses a mobile station (MS) 2 to access network services. The MS 2 may be a portable communications unit, such as a hand-held cellular phone, a communication unit installed in a vehicle, or a fixed-location communications unit.

The electromagnetic waves for the MS 2 are transmitted by the Base Transceiver System (BTS) 3 also known as node B. The BTS 3 consists of radio devices such as antennas and equipment for transmitting and receiving radio waves. The BS 6 Controller (BSC) 4 receives the transmissions from one or more BTS's. The BSC 4 provides control and management of the radio transmissions from each BTS 3 by exchanging messages with the BTS and the Mobile Switching Center (MSC) 5 or Internal IP Network. The BTS's 3 and BSC 4 are part of the BS 6 (BS) 6.

The BS 6 exchanges messages with and transmits data to a Circuit Switched Core Network (CSCN) 7 and Packet Switched Core Network (PSCN) 8. The CSCN 7 provides traditional voice communications and the PSCN 8 provides Internet applications and multimedia services.

The Mobile Switching Center (MSC) 5 portion of the CSCN 7 provides switching for traditional voice communications to and from a MS 2 and may store information to support these capabilities. The MSC 2 may be connected to one of more BS's 6 as well as other public networks, for example a Public Switched Telephone Network (PSTN) (not shown) or Integrated Services Digital Network (ISDN) (not shown). A Visitor Location Register (VLR) 9 is used to retrieve information for handling voice communications to or from a visiting subscriber. The VLR 9 may be within the MSC 5 and may serve more than one MSC.

A user identity is assigned to the Home Location Register (HLR) 10 of the CSCN 7 for record purposes such as subscriber information, for example Electronic Serial Number (ESN), Mobile Directory Number (MDR), Profile Information, Current Location, and Authentication Period. The Authentication Center (AC) 11 manages authentication information related to the MS 2. The AC 11 may be within the HLR 10 and may serve more than one HLR. The interface between the MSC 5 and the HLR/AC 10, 11 is an IS-41 standard interface 18.

The Packet data Serving Node (PDSN) 12 portion of the PSCN 8 provides routing for packet data traffic to and from MS 2. The PDSN 12 establishes, maintains, and terminates link layer sessions to the MS 2's 2 and may interface with one of more BS 6 and one of more PSCN 8.

The Authentication, Authorization and Accounting (AAA) 13 Server provides Internet Protocol authentication, authorization and accounting functions related to packet data traffic. The Home Agent (HA) 14 provides authentication of MS 2 IP registrations, redirects packet data to and from the Foreign Agent (FA) 15 component of the PDSN 8, and receives provisioning information for users from the AAA 13. The HA 14 may also establish, maintain, and terminate secure communications to the PDSN 12 and assign a dynamic IP address. The PDSN 12 communicates with the MA 13, HA 14 and the Internet 16 via an Internal IP Network.

There are several types of multiple access schemes, specifically Frequency Division Multiple Access (FDMA), Time Division Multiple Access (TDMA) and Code Division Multiple Access (CDMA). In FDMA, user communications are separated by frequency, for example, by using 30 KHz channels. In TDMA, user communications are separated by frequency and time, for example, by using 30 KHz channels with 6 timeslots. In CDMA, user communications are separated by digital code.

In CDMA, All users on the same spectrum, for example, 1.25 MHz. Each user has a unique digital code identifier and the digital codes separate users to prevent interference.

A CDMA signal uses many chips to convey a single bit of information. Each user has a unique chip pattern, which is essentially a code channel. In order to recover a bit, a large number of chips are integrated according to a user's known chip pattern. Other user's code patterns appear random and are integrated in a self-canceling manner and, therefore, do not disturb the bit decoding decisions made according to the user's proper code pattern.

Input data is combined with a fast spreading sequence and transmitted as a spread data stream. A receiver uses the same spreading sequence to extract the original data. FIG. 2A illustrates the spreading and de-spreading process. As illustrated in FIG. 2B, multiple spreading sequences may be combined to create unique, robust channels.

A Walsh code is one type of spreading sequence. Each Walsh code is 64 chips long and is precisely orthogonal to all other Walsh codes. The codes are simple to generate and small enough to be stored in read only memory (ROM).

A short PN code is another type of spreading sequence. A short PN code consists of two PN sequences (I and Q), each of which is 32,768 chips long and is generated in similar, but differently tapped 15-bit shift registers. The two sequences scramble the information on the I and Q phase channels.

A long PN code is another type of spreading sequence. A long PN code is generated in a 42-bit register and is more than 40 days long, or about $4 \times 10^{13}$ chips long. Due to its length, a long PN code cannot be stored in ROM in a terminal and, therefore, is generated chip-by-chip.

Each MS 2 codes its signal with the PN long code and a unique offset, or Public long code Mask, computed using the long PN code ESN of 32-bits and 10 bits set by the system. The Public long code Mask produces a unique shift. Private long code Masks may be used to enhance privacy. When integrated over as short a period as 64 chips, MS 2 with different long PN code offsets will appear practically orthogonal.

CDMA communication uses forward channels and reverse channels. A forward channel is utilized for signals from a BTS 3 to a MS 2 and a reverse channel is utilized for signals from a MS to a BTS.

A forward channel uses its specific assigned Walsh code and a specific PN offset for a sector, with one user able to have multiple channel types at the same time. A forward channel is identified by its CDMA RF carrier frequency, the unique short code PN Offset of the sector and the unique Walsh code of the user. CDMA forward channels include a pilot channel, sync channel, paging channels and traffic channels.

The pilot channel is a "structural beacon" which does not contain a character stream, but rather is a timing sequence used for system acquisition and as a measurement device during handoffs. A pilot channel uses Walsh code 0.

The sync channel carries a data stream of system identification and parameter information used by MS 2 during system acquisition. A sync channel uses Walsh code 32.

There may be from one to seven paging channels according to capacity requirements. Paging channels carry pages, system parameter information and call setup orders. Paging channels use Walsh codes 1-7.

The traffic channels are assigned to individual users to carry call traffic. Traffic channels use any remaining Walsh codes subject to overall capacity as limited by noise.

A reverse channel is utilized for signals from a MS 2 to a BTS 3 and uses a Walsh code and offset of the long PN sequence specific to the MS, with one user able to transmit multiple types of channels simultaneously. A reverse channel is identified by its CDMA RF carrier frequency and the unique long code PN Offset of the individual MS 2. Reverse channels include traffic channels and access channels.

Individual users use traffic channels during actual calls to transmit traffic to the BTS 3. A reverse traffic channel is basically a user-specific Public or Private long code Mask and there are as many reverse traffic channels as there are CDMA terminals.

An MS 2 not yet involved in a call uses access channels to transmit registration requests, call setup requests, page responses, order responses and other signaling information. An access channel is basically a Public long code Offset unique to a BTS 3 sector. Access channels are paired with paging channels, with each paging channel having up to 32 access channels.

CDMA communication provides many advantages. Some of the advantages are variable rate vocoding and multiplexing, forward power control, use of RAKE receivers and soft handoff.

CDMA allows the use of variable rate vocoders to compress speech, reduce bit rate and greatly increase capacity. Variable rate vocoding provides full bit rate during speech, low data rates during speech pauses, increased capacity and natural sound. Multiplexing allows voice, signaling and user secondary data to be mixed in CDMA frames.

By utilizing forward power control, the BTS 3 continually reduces the strength of each user's forward baseband chip stream. When a particular MS 2 experiences errors on the forward link, more energy is requested and a quick boost of energy is supplied after which the energy is again reduced.

Reverse power control uses three methods in tandem to equalize all terminal signal levels at the BTS 3. Reverse open loop power control is characterized by the MS 2 adjusting power up or down based on a received BTS 3 signal (AGC). Reverse closed loop power control is characterized by the BTS 3 adjusting power up or down by 1 db at a rate of 800 times per second. Reverse outer loop power control is characterized by the BSC 4 adjusting a BTS 3 set point when the BSC has forward error correction (FER) trouble hearing the MS 2. FIG. 3 illustrates the three reverse power control methods.

The actual RF power output of the MS 2 transmitter (TXPO), including the combined effects of open loop power control from receiver AGC and closed loop power control by the BTS 3, cannot exceed the maximum power of the MS, which is typically +23 dbm. Reverse power control is performed according to the equation "TXPO=$-(RX_{dbm})$-C+ TXGA," where "TXGA" is the sum of all closed loop power control commands from the BTS 3 since the beginning of a call and "C" is +73 for 800 MHZ systems and +76 for 1900 MHz systems.

Using a RAKE receiver allows a MS 2 to use the combined outputs of the three traffic correlators, or "RAKE fingers," every frame. Each RAKE finger can independently recover a particular PN Offset and Walsh code. The fingers may be targeted on delayed multipath reflections of different BTS's 3, with a searcher continuously checking pilot signals. FIG. 4 illustrates the use of a RAKE receiver.

The MS 2 drives soft Handoff. The MS 2 continuously checks available pilot signals and reports to the BTS 3 regarding the pilot signals it currently sees. The BTS 3 assigns up to a maximum of six sectors and the MS 2 assigns its fingers accordingly. Al messages are sent by dim-and-burst without muting. Each end of the communication link chooses the best configuration on a frame-by-frame basis, with handoff transparent to users.

The MS 2 considers pilot signals in sets, specifically an Active set, a Candidates set, a Neighbors set and a Remaining set. The Active set include the pilot signals of sectors actually in use. The Candidates set includes pilot signals requested by the MS 2 but not yet set up for transmitting by the BTS 3. The Neighbors set includes pilot signals indicated by the BTS 3 as nearby sectors to check. The Remaining set includes any pilot signals used by the BTS 3 but not already in the other sets.

The MS 2 sends the pilot signal strength measurements to the BTS 3 whenever a pilot signal in a Neighbor or Remaining set exceeds a first threshold (T_ADD), an Active set pilot signal drops below a second threshold (T_DROP) or a Candidate pilot signal exceeds an Active set pilot signal by a given amount (T_COMP). The BTS 3 may set up all requested handoffs or may apply screening criteria to authorize only some requested handoffs.

A cdma2000 system is a third-generation (3G) wideband; spread spectrum radio interface system that uses the enhanced service potential of CDMA technology to facilitate data capabilities, such as Internet and intranet access, multimedia applications, high-speed business transactions, and telemetry. The focus of cdma2000, as is that of other third-generation systems, is on network economy and radio transmission design to overcome the limitations of a finite amount of radio spectrum availability.

FIG. 5 illustrates a data link protocol architecture layer 20 for a cdma2000 wireless network. The data link protocol architecture layer 20 includes an Upper Layer 60, a Link Layer 30 and a Physical layer 21.

The Upper layer 60 includes three sublayers; a Data Services sublayer 61; a Voice Services sublayer 62 and a Signaling Services sublayer 63. Data services 61 are services that deliver any form of data on behalf of a mobile end user and include packet data applications such as IP service, circuit data applications such as asynchronous fax and B-ISDN emulation services, and SMS. Voice services 62 include PSTN access, mobile-to-mobile voice services, and Internet telephony. Signaling 63 controls all aspects of mobile operation.

The Signaling Services sublayer 63 processes all messages exchanged between the MS 2 and BS 6. These messages control such functions as call setup and teardown, handoffs, feature activation, system configuration, registration and authentication.

In the MS 2, the Signaling Services sublayer 63 is also responsible for maintaining call process states, specifically a MS 2 Initialization State, MS 2 Idle State, System Access State and MS 2 Control on Traffic Channel State.

The Link Layer 30 is subdivided into the Link Access Control (LAC) sublayer 32 and the Medium Access Control (MAC) sublayer 31. The Link Layer 30 provides protocol support and control mechanisms for data transport services and performs the functions necessary to map the data transport needs of the Upper layer 60 into specific capabilities and characteristics of the Physical Layer 21. The Link Layer 30 may be viewed as an interface between the Upper Layer 60 and the Physical Layer 20.

The separation of MAC 31 and LAC 32 sublayers is motivated by the need to support a wide range of Upper Layer 60 services and the requirement to provide for high efficiency and low latency data services over a wide performance range, specifically from 1.2 Kbps to greater than 2 Mbps. Other motivators are the need for supporting high Quality of Service (QoS) delivery of circuit and packet data services, such as limitations on acceptable delays and/or data BER (bit error rate), and the growing demand for advanced multimedia services each service having a different QoS requirements.

The LAC sublayer 32 is required to provide a reliable, in-sequence delivery transmission control function over a point-to-point radio transmission link 42. The LAC sublayer 32 manages point-to point communication channels between upper layer 60 entities and provides framework to support a wide range of different end-to-end reliable Link Layer 30 protocols.

The Link Access Control (LAC) sublayer 32 provides correct delivery of signaling messages. Functions include assured delivery where acknowledgement is required, unassured delivery where no acknowledgement is required, duplicate message detection, address control to deliver a message to an individual MS 2, segmentation of messages into suitable sized fragments for transfer over the physical medium, reassembly and validation of received messages and global challenge authentication.

The MAC sublayer 31 facilitates complex multimedia, multi-services capabilities of 3G wireless systems with QoS management capabilities for each active service. The MAC sublayer 31 provides procedures for controlling the access of packet data and circuit data services to the Physical Layer 21, including the contention control between multiple services from a single user, as well as between competing users in the wireless system. The MAC sublayer 31 also performs mapping between logical channels and physical channels, multiplexes data from multiple sources onto single physical channels and provides for reasonably reliable transmission over the Radio Link Layer using a Radio Link Protocol (RLP) 33 for a best-effort level of reliability. Signaling Radio Burst Protocol (SRBP) 35 is an entity that provides connectionless protocol for signaling messages. Multiplexing and QoS Control 34 is responsible for enforcement of negotiated QoS levels by mediating conflicting requests from competing services and the appropriate prioritization of access requests.

The Physical Layer 20 is responsible for coding and modulation of data transmitted over the air. The Physical Layer 20 conditions digital data from the higher layers so that the data may be transmitted over a mobile radio channel reliably.

The Physical Layer 20 maps user data and signaling, which the MAC sublayer 31 delivers over multiple transport channels, into a physical channels and transmits the information over the radio interface. In the transmit direction, the functions performed by the Physical Layer 20 include channel coding, interleaving, scrambling, spreading and modulation. In the receive direction, the functions are reversed in order to recover the transmitted data at the receiver.

FIG. 6 illustrates an overview of call processing. Processing a call includes pilot and sync channel processing, paging channel processing, Access channel processing and traffic channel processing.

Pilot and sync channel processing refers to the MS 2 processing the pilot and sync channels to acquire and synchronize with the CDMA system in the MS 2 Initialization State. Paging channel processing refers to the MS 2 monitoring the paging channel or the forward common control channel (F-CCCH) to receive overhead and mobile-directed messages from the BS 6 in the Idle State. Access channel processing refers to the MS 2 sending messages to the BS 6 on the access channel or the Enhanced access channel in the System Access State, with the BS 6 always listening to these channels and responding to the MS on either a paging channel or the F-CCCH. Traffic channel processing refers to the BS 6 and MS 2 communicating using dedicated forward and reverse traffic channels in the MS 2 Control on Traffic Channel State, with the dedicated forward and reverse traffic channels carrying user information, such as voice and data.

FIG. 7 illustrates the initialization state of a MS 2. The Initialization state includes a System Determination Substate, pilot channel processing, sync channel Acquisition, a Timing Change Substate and a Mobile Station Idle State.

System Determination is a process by which the MS 2 decides from which system to obtain service. The process could include decisions such as analog versus digital, cellular versus PCS, and A carrier versus B carrier. A custom selection process may control System determination. A service provider using a redirection process may also control System determination. After the MS 2 selects a system, it must determine on which channel within that system to search for service. Generally the MS 2 uses a prioritized channel list to select the channel.

Pilot channel processing is a process whereby the MS 2 first gains information regarding system timing by searching for usable pilot signals. Pilot channels contain no information, but the MS 2 can align its own timing by correlating with the pilot channel. Once this correlation is completed, the MS 2 is synchronized with the sync channel and can read a sync channel message to further refine its timing. The MS 2 is permitted to search up to 15 seconds on a single pilot channel before it declares failure and returns to System Determination to select either another channel or another system. The searching procedure is not standardized, with the time to acquire the system depending on implementation.

In cdma2000, there may be many pilot channels, such as OTD pilot, STS pilot and Auxiliary pilot, on a single channel. During system acquisition, the MS 2 will not find any of these pilot channels because they are use different Walsh codes and the MS is only searching for Walsh 0.

The sync channel message is continuously transmitted on the sync channel and provides the MS 2 with the information to refine timing and read a paging channel. The mobile receives information from the BS 6 in the sync channel message that allows it to determine whether or not it will be able to communicate with that BS.

The cdma2000 messages are backward compatible with IS-95 MS 2. For example, the first 13 fields of the sync channel message are identical to those specified in IS-95. When an IS-95 MS 2 acquires a sync channel, it examines only the first 13 fields and ignores the remaining fields.

All new cdma2000 fields occur after the IS-95 compatible fields. The new cdma2000 fields specify parameters for the Spreading Rate 1 Broadcast control channel (BCCH) for TD and non-TD modes and for the Spreading Rate 3 BCCH and pilot channel.

FIG. 8 illustrates the System Access state. The first step in the system access process is to update overhead information to ensure that the MS 2 is using the correct access channel parameters, such as initial power level and power step increments. A MS 2 randomly selects an access channel and transmits without coordination with the BS 6 or other MS. Such a random access procedure can result in collisions. Several steps can be taken to reduce the likelihood of collision, such as use of a slotted structure, use of a multiple access channel, transmitting at random start times and employing congestion control, for example, overload classes.

The MS 2 may send either a request or a response message on the access channel. A request is a message sent autonomously, such as an Origination message. A response is a message sent in response to a message received from the BS 6. For example, a Page Response message is a response to a General Page message or a Universal message.

FIG. 9 illustrates a Mobile Traffic Channel state. The Mobile Traffic Channel state includes Service Negotiation, an Active Mode and a Control Hold Mode.

Service Negotiation is a process by which the MS 2 and the BS 6 negotiate which service options will be used during a call and how the radio channel will be configured to support those services. Typically, service negotiation occurs at the beginning of a call, although it may occur at any time during a call if necessary.

While operating in the Traffic Channel Substate, the MS 2 may operate in either the Active Mode or the Control Hold Mode. In the Active Mode, the reverse pilot channel is active, along with either the R-FCH, R-DCCH. R-SCH or R-PDCH may be active if high-speed data is available. In the Control Hold Mode, only the reverse pilot channel is transmitted and it may be operating in a gated mode, such as ½ or ¼, to reduce transmit power.

FIG. 10 illustrates the transmitting function of the Multiplexing and QoS Control sublayer 34. A data Block is a block of data that belongs to the same service or signaling. A MuxPDU is a MuxSDU and Header. The header specifies the signaling as primary or secondary. The MuxPDU Type determines the Rate Set and how to parse the MuxPDU. The Mux Option determines a maximum number of MuxPDUs on the SCH, Single-size or Double Size MuxPDUs and MuxPDU Types. The LTU includes 1, 2, 4 or 8 MuxPDUs that are protected by CRC.

The Multiplexing and QoS Control sublayer 34 operates in time synchronization with the Physical Layer 21. If the Physical Layer 21 is transmitting with a non-zero frame offset, the Multiplexing and QoS Control sublayer 34 delivers Physical Layer SDUs for transmission by the Physical Layer at the appropriate frame offset from system time.

The Multiplexing and QoS Control sublayer 34 delivers a Physical Layer 21 SDU to the Physical Layer using a physical-channel specific service interface set of primitives. The Physical Layer 21 delivers a Physical Layer SDU to the Multiplexing and QoS Control sublayer 34 using a physical channel specific Receive Indication service interface operation.

The SRBP Sublayer 35 includes the sync channel, forward common control channel, broadcast control channel, paging channel and access channel procedures.

The LAC Sublayer 32 provides services to Layer 3 60. SDUs are passed between Layer 3 60 and the LAC Sublayer 32. The LAC Sublayer 32 provides the proper encapsulation of the SDUs into LAC PDUs, which are subject to segmentation and reassembly and are transferred as encapsulated PDU fragments to the MAC Sublayer 31.

Processing within the LAC Sublayer 32 is done sequentially, with processing entities passing the partially formed LAC PDU to each other in a well-established order. SDUs and PDUs are processed and transferred along functional paths, without the need for the upper layers to be aware of the radio characteristics of the physical channels. However, the upper layers could be aware of the characteristics of the physical channels and may direct Layer 2 30 to use certain physical channels for the transmission of certain PDUs.

A 1xEV-DO system is optimized for packet data service and characterized by a single 1.25 MHz carrier ("1x") for data only or data Optimized ("DO"). Furthermore, there is a peak data rate of 4.91512 Mbps on the forward Link and 1.8432 Mbps on the reverse Link. Moreover 1xEV-DO provides separated frequency bands and internetworking with a 1x System. FIG. 11 illustrates a comparison of cdma2000 for 1x and 1xEV-DO.

In a cdma2000 system, there are concurrent services, whereby voice and data are transmitted together at a maximum data rate of 614.4 kbps and 307.2 kbps in practice. An MS 2 communicates with the MSC 5 for voice calls and with the PDSN 12 for data calls. CDMA2000 is characterized by a fixed rate with variable power with a Walsh-code separated forward traffic channel.

In a 1xEV-DO system, the maximum data rate is 2.4 Mbps or 3.072 Mbps and there is no communication with the circuit-switched core network 7. 1xEV-DO is characterized by fixed power and a variable rate with a single forward channel that is time division multiplexed.

FIG. 12 illustrates a 1xEV-DO system architecture. In a 1xEV-DO system, a frame consists of 16 slots, with 600 slots/sec, and has a duration of 26.67 ms, or 32,768 chips. A single slot is 1.6667 ms long and has 2048 chips. A control/traffic channel has 1600 chips in a slot, a pilot channel has 192 chips in a slot and a MAC channel has 256 chips in a slot. A 1xEV-DO system facilitates simpler and faster channel estimation and time synchronization.

FIG. 13 illustrates Physical Layer channels for a 1xEV-DO system. FIG. 14 illustrates a 1xEV-DO default protocol architecture. FIG. 15 illustrates a 1xEV-DO non-default protocol architecture.

Information related to a session in a 1xEV-DO system includes a set of protocols used by an MS 2, or access terminal (AT), and a BS 6, or access network (AN), over an airlink, a Unicast Access Terminal Identifier (UATI), configuration of the protocols used by the AT and AN over the airlink and an estimate of the current AT location.

FIG. 16 illustrates the establishment of a 1xEV-DO session. As illustrated in FIG. 16, establishing a session includes address configuration, Connection Establishment, Session configuration and Exchange Keys.

Address configuration refers to an Address Management protocol assigning a UATI and Subnet mask. Connection Establishment refers to Connection Layer protocols setting up a radio link. Session configuration refers to a Session Configuration Protocol configuring all protocols. Exchange Keys refers a Key Exchange protocol in the Security Layer setting up keys for authentication.

A "session" refers to the logical communication link between the AT 2 and the RNC, which remains open for hours, with a default of 54 hours. A session lasts until the PPP session is active as well. Session information is controlled and maintained by the RNC in the AN 6.

When a connection is opened, the AT 2 can be assigned the forward traffic channel and is assigned a reverse traffic channel and reverse power control channel. Multiple connections may occur during single session. There are two connection states in a 1xEV-DO system, a closed connection and an Open connection.

A closed connection refers to a state where the AT 2 is not assigned any dedicated air-link resources and communications between the AT and AN 6 are conducted over the access channel and the control channel. An open connection refers to a state where the AT 2 can be assigned the forward traffic channel, is assigned a reverse power control channel and a reverse traffic channel and communication between the AT 2 and AN 6 is conducted over these assigned channels as well as over the control channel.

The Connection Layer manages initial acquisition of the network, setting an Open connection and closed connection and communications. Furthermore, the Connection Layer maintains an approximate AT 2 location in both the Open connection and closed connection and manages a radio link between the AT 2 and the AN 6 when there is an Open connection. Moreover, the Connection Layer performs supervision in both the Open connection and closed connection, prioritizes and encapsulates transmitted data received from the Session Layer, forwards the prioritized data to the Security Layer and decapsulates data received from the Security Layer and forwards it to the Session Layer.

FIG. 17 illustrates Connection Layer Protocols. As illustrated in FIG. 17, the protocols include an Initialization State, an Idle State and a Connected State.

In the Initialization State, the AT 2 acquires the AN 6 and activates the initialization State Protocol. In the Idle State, a closed connection is initiated and the Idle State Protocol is activated. In the connected State, an Open connection is initiated and the Connected State Protocol is activated.

The Initialization State Protocol performs actions associated with acquiring an AN 6. The Idle State Protocol performs actions associated with an AT 2 that has acquired an AN 6, but does not have an Open connection, such as keeping track of the AT location using a Route Update Protocol. The Connected State Protocol performs actions associated with an AT 2 that has an Open connection, such as managing the radio link between the AT and AN 6 and managing the procedures leading to a closed connection. The Route Update Protocol performs actions associated with keeping track of the AT 2 location and maintaining the radio link between the AT and AN 6. The Overhead message Protocol broadcasts essential parameters, such as QuickConfig, SectorParameters and AccessParameters message, over the control channel. The Packet Consolidation Protocol consolidates and prioritizes packets for transmission as a function of their assigned priority and the target channel as well as providing packet demultiplexing on the receiver.

The 1xEV-DO forward Link is characterized in that no power control and no soft handoff is supported. The AN 6 transmits at constant power and the AT 2 requests variable rates on the forward Link. Because different users may transmit at different times in TDM, it is difficult to implement diversity transmission from different BS's 6 that are intended for a single user.

The Physical Layer is characterized by a spreading rate of 1.2288 Mcps, a frame consisting of 16 slots and 26.67 ms, with a slot of 1.67 ms and 2048 chips. The forward Link channel includes a pilot channel, a forward traffic channel or control channel and a MAC channel.

The pilot channel is similar to the to the cdma2000pilot channel in that it comprises all "0" information bits and Walsh-spreading with W0 with 192 chips for a slot.

The forward traffic channel is characterized by a data rate that varies from 38.4 kbps to 2.4576 Mbps or from 4.8 kbps to 3.072 Mbps. Physical Layer packets can be transmitted in 1 to 16 slots and the transmit slots use 4-slot interlacing when more than one slot is allocated. If ACK is received on the reverse Link ACK channel before all of the allocated slots have been transmitted, the remaining slots shall not be transmitted.

The control channel is similar to the sync channel and paging channel in CDMA2000. The control channel is characterized by a period of 256 slots or 426.67 ms, a Physical Layer packet length of 1024 bits or 128, 256, 512 and 1024 bits and a data rate of 38.4 kbps or 76.8 kbps or 19.2 kbps, 38.4 kbps or 76.8 kbps.

The MAC channel provides a reverse Activity (RA) channel, a reverse power control channel, a DRCLock channel, an ARQ channel and a pilot channel.

The reverse Activity (RA) channel is used by the AN 2 to inform all ATs within its coverage area of the current activity on the reverse Link and is a MAC channel with MAC Index 4. The RA channel carries reverse Activity Bits (RAB), with RAB transmitted over RABLength successive slots (Subtype 0, 1) with a bit rate of (600/RABLength) bps or 600 bps.

The AN 6 uses the reverse power control (RPC) channel for power control of the AT's 2 reverse link transmissions. A reverse power control Bit is transmitted through the RPC channel, with a data rate of 600(1−1/DRCLockPeriod) bps or 150 bps.

The DRCLock channel prevents a situation where the DRC does not schedule an AT 2 for forward transmission and the AT continues to request service through the DRC if a sector cannot hear the DRC for the particular AT. If the DRCLock bit for the AT 2 is set, the AT stops sending the DRC to the sector. The DRCLock channel data rate is 600/(DRCLockLength× DRCLockPeriod) bps or (150/DRCLockLength) bps.

The ARQ channel supports reverse Link Hybrid-ARQ (H-ARQ), whereby remaining sub-packets are not transmitted if the AN 6 has resolved the Physical Layer packet. H-ARQ indicates whether the AN 6 successfully received the packet transmitted in slot m-8, m-7, m-6 and m-5.

DRC channel is used by the AT 2 to indicate the selected serving sector and the requested data rate on the forward traffic channel to the AN 6. The requested data rate is mapped into a 4-digit DRC value, with an 8-ary Walsh function corresponding to the selected serving sector used to spread the DRC channel transmission. The DRCCover from the Forward Traffic Channel MAC protocol defines the cover mapping. DRC values are transmitted at a data rate of 600/DRCLength DRC values per second, with a maximum rate of 600 per second and a minimum rate of 75 per second.

Scheduling at the BS 6 is implemented at the sector and facilitates a BS determining which user's data should be transmitted next by allocating the bandwidth to different ATs 2 based on their DRCs. Possible Schedulers include Round Robin, Best Rate and Proportional Fairness. Scheduler Inputs include DRC, ACK/NAK, QoS and Subscriber profile, History, Traffic Model and AT Capability.

Round Robin emphasizes basic fairness. Best Rate emphasizes throughput. Proportional Fairness balances both fairness and throughput.

Data transmission to the selected user facilitates a BS 6 determining the FL data rate, modulation scheme and coding rate using the reported DRC. In Fat Pipe Scheduling, all ATs 2 in a sector share the 1.25 MHz radio carrier, with the pipe divided into 1.667 ms slots and, if a packet requires more than one slot, fragments of the packet are transmitted on four slot intervals.

In 4-slot Interlacing, transmission slots of a Physical Layer packet are separated by three slots, with other Physical Layer packets transmitted in the slots between those transmit slots. If ACK is received on the ACK channel before all of the allocated slots have been transmitted, remaining untransmitted slots are not transmitted (Hybrid ARQ).

ACK/NAK facilitates an AT 2 receiving some of the data and verifying the checksum. FIG. 18 illustrates ACK/NAK operation in the forward Link.

The AT 2 uses the ACK channel to inform the AN 6 whether a Physical Layer packet transmitted on the forward traffic channel has been received successfully. Specifically, the ACK bit is set to 0 indicates CRC OK and the ACK bit set to 1 indicates CRC Fail. FIG. 40 illustrates the use of the ACK channel in the reverse Link.

New cellular communication systems occupying larger bandwidths are currently under development. For example, 3GPP, 3GPP2 and IEEE 802.20 air-interfaces are currently targeted for spectrum allocations up to 20 MHz. Future systems may occupy upwards of 100 MHz. This has been primarily motivated for the general desire for greater end-user information transmission rates and quality of service (QoS).

One of the many challenges in the design of such systems is the support of various traffic applications with varying QoS requirements, such as date rate, latency, packet error rate and jitter. For example, the QoS requirements of VoIP users with low latency and low rate requirements must be balanced with the QoS requirements of web-browsing users with more lenient latency and larger rate requirements.

Furthermore, given the general trend towards All-IP networks, it is anticipated that a wide range of traffic types will need to be supported. For example, VoIP users may need a multiple access method which incurs low latency whereas web-browsing users may need a multiple access scheme that allow for opportunistic scheduling, such as transmissions scheduled during "good" fades and not scheduled during "bad" fades.

A second major challenge is in the design of an air-interface that is appropriate for the channel conditions experienced by each user. For example, for users with high received SNR, OFDM/OFDMA may be appropriate whereas for users with lower received SNR where processing gain, such as bandwidth expansion factors, are needed, MC-CDMA may be appropriate.

Therefore, transmission systems must support various traffic QoS requirements and various channel conditions. Furthermore, conventional serving cell switching is rather slow in 3G wireless systems, such as the 64-slot DSC configuration in a high rate packet data (HRPD) system, and the data transfer from one cell to another is the main cause of delay in cell switching.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

The invention is directed to multiple access design of cellular communication systems supporting multiple users that are based on some combination of OFDM, OFDMA, Single-carrier FDMA and/or MC-CDMA or any system using discrete tones or sinusoids as its underlying mode of transmission.

In one aspect of the present invention a method for providing a first data packet to a first terminal and a second data packet to a second terminal in a mobile communication system using ARQ where the first data packet and second data packet each include a plurality of sub packets is provided. The method includes transmitting the first data packet to the first terminal and transmitting the second data packet to the second terminal, wherein a first sub packet of the second data packet is transmitted delayed from the first sub packet of the first data packet such that if an ACK is received prior to sending all of the plurality of sub packets of the first data packet, at least one of the plurality of sub packets of the second data packet remains to be transmitted.

It is contemplated that the plurality of sub packets of the first data packet and the plurality of sub packets of the second data packet are transmitted according to a slotted transmission scheme such that there is at least one unused transmission slot between each of the plurality of sub packets of each of the first and second data packets. It is further contemplated that each of the plurality of sub packets of the first data packet are transmitted approximately simultaneously with a corresponding one of the plurality of sub packets of the second data packet. Preferably, the mobile communication system includes MC-CDMA.

In another aspect of the present invention a method for providing a plurality of users with a plurality of multiple access techniques in a multiple access mobile communication system that utilizes discrete tones for transmission of signals is provided. The method includes defining the plurality of multiple access techniques, determining communication requirements of the plurality of users, assigning each of the plurality of users to one of the plurality of defined multiple access techniques and partitioning the discrete tones among the plurality of users in a time domain, wherein the partitioning is performed according to at least one of the number of the plurality of users, power requirements of each of the plurality of users, voice communication rate requirements of each of the plurality of users and a number of antennas in the mobile communication system.

It is contemplated that the partitioning is synchronized among at least one of a plurality of base stations and cell sectors. It is further contemplated that the method further includes providing an indication of the partitioning to the plurality of users via a broadcast message either periodically or upon changing the partitioning.

It is contemplated that the plurality of techniques include MC-CDMA and the method further includes varying the length of a spreading code according to the number of the plurality of users assigned to MC-CDMA. It is further contemplated that ARQ is supported and the method further includes partitioning the discrete tones in the time domain by delaying a transmission of a fist sub packet of a first data packet to at least one of the plurality of users relative to a transmission of a first sub packet of a second sub packet of a data packet to at least a second of the plurality of users.

In another aspect of the present invention, a method for providing at least one data packet to a terminal in communication with a plurality of base stations in a mobile communication system in which each of the plurality of base stations serves a different cell is provided. The method includes transmitting a control message to each of the plurality of base stations, the control message identifying one of the plurality of base stations as a serving base station and receiving the at least one data packet only from the identified base station.

It is contemplated that each of the at least one data packet includes a plurality of sub packets and further includes receiving each of the plurality of sub packets of the at least one data packet only from the identified base station. It is further contemplated that the control message is transmitted to each of the plurality of base stations after receiving the first of the plurality of sub packets of a first of the at least one data packet, the control message identifying a different one of the plurality of base stations as the serving base station and further including receiving each of the rest of the plurality of sub packets of the first of the at least one data packet only from the same base station from which the first of the plurality of sub packets was received and receiving each of the plurality of sub packets of a second of the at least one data packet only from the identified different one of the plurality of base stations.

It is contemplated that the mobile communication system is a HRPD system. It is further contemplated that the control message is DRC cover message.

In another aspect of the present invention, a method for providing at least one data packet to a mobile communication terminal in communication with a plurality of base stations, each of the plurality of base stations serving a different cell, is provided. The method includes receiving the at least one data packet from a network, receiving a control message, the control message including an identification of one of the plurality of base stations as a serving base station and transmitting the at least one data packet only if the identification in the control message matches an internal identification.

It is contemplated that the method further includes discarding without transmitting the at least one data packet if the identification in the control message does not match the internal identification. It is further contemplated that each of the at least one data packet includes a plurality of sub packets and further including transmitting each of the plurality of sub packets of the at least one data packet only if the identification in the control message matches an internal identification.

It is contemplated that the control message is received after transmitting the first of the plurality of sub packets of a first of the at least one data packet, the control message including an identification not matching the internal identification and further including transmitting each of the rest of the plurality of sub packets of the first of the at least one data packet, receiving a second of the at least one data packet from the network and discarding without transmitting each of the plurality of sub packets of the second of the at least one data packet. It is further contemplated that the mobile communication system is a HRPD system.

It is contemplated that the control message is DRC cover message. It is further contemplated that the at least one data packet is received from a base station controller.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

FIG. 11 illustrates a comparison of cdma2000 for 1x and 1xEV-DO.

FIG. 19 illustrates an all MC-CDMA traffic configuration.

FIG. 20 illustrates an all OFDM traffic configuration.

FIG. 21 illustrates a configuration of evenly mixed VoIP and web browsing traffic.

FIG. 22 illustrates a configuration of light VoIP traffic and more web browsing traffic partitioned only in the frequency domain.

FIG. 23 illustrates a configuration of a low number of VoIP traffic users partitioned in both the time and the frequency domain.

FIG. 24 illustrates ARQ operations for MC-CDMA.

FIG. 26 illustrates a method according to an embodiment of the present invention.

DETAILED DESCRIPTION OF THE PREFERRED EMBODIMENTS

Figure 1:
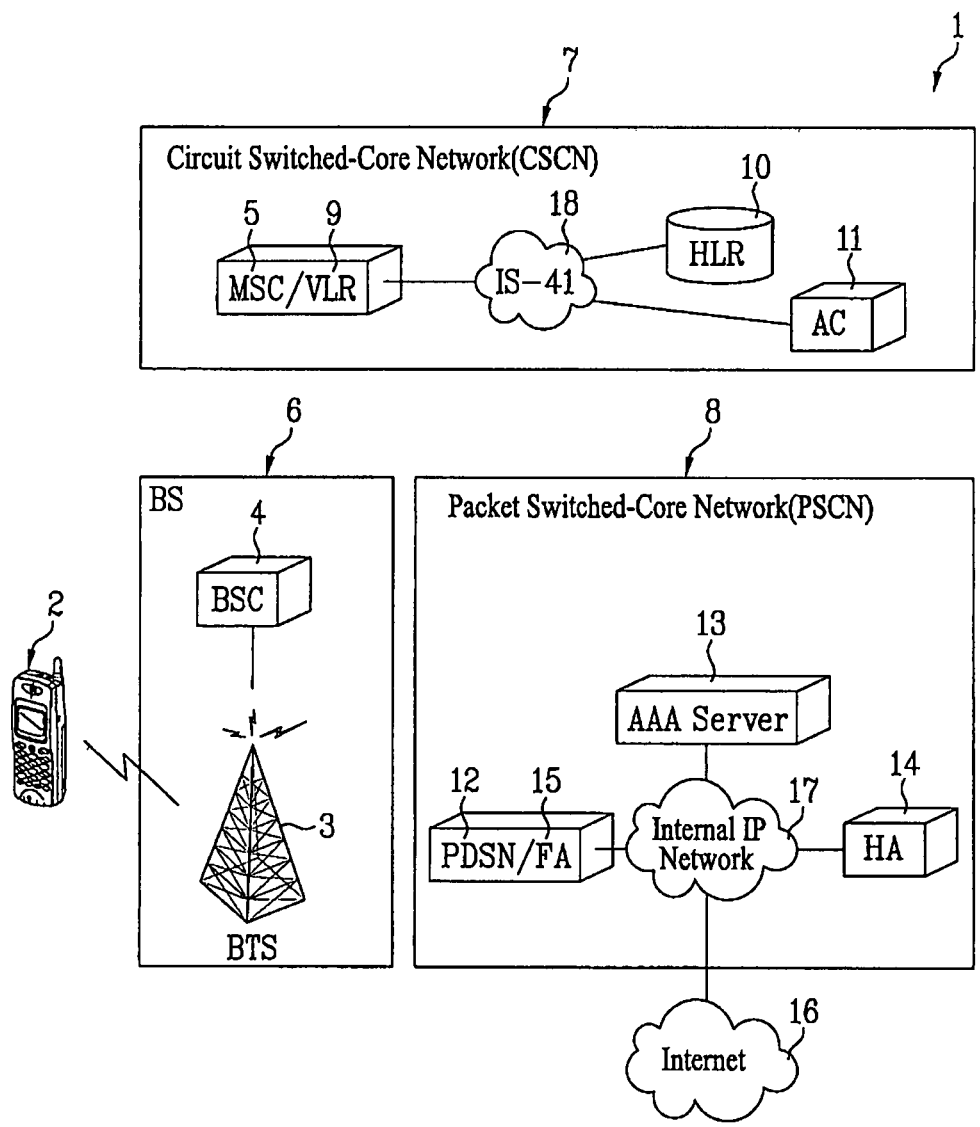
FIG. 1 illustrates wireless communication network architecture.
Figure 2A:
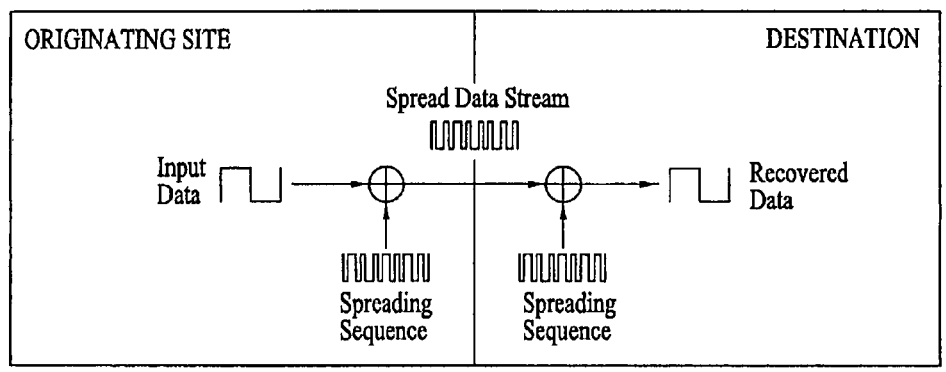
FIG. 2A illustrates a CDMA spreading and de-spreading process.
Figure 2B:
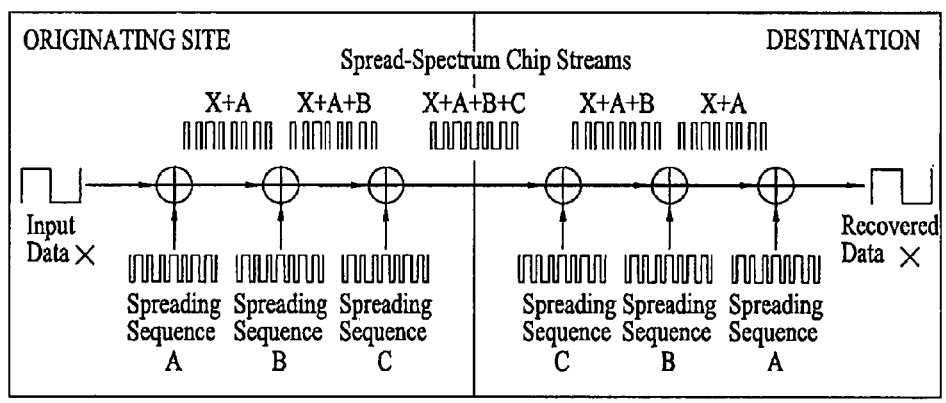
FIG. 2B illustrates a CDMA spreading and de-spreading process using multiple spreading sequences.
Figure 3:
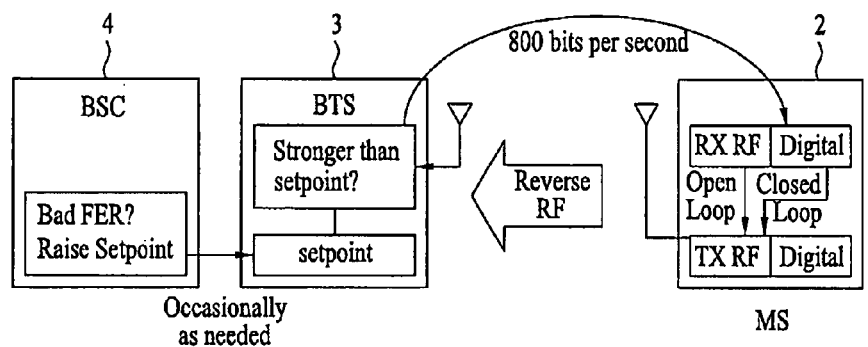
FIG. 3 illustrates CDMA reverse power control methods.
Figure 4:
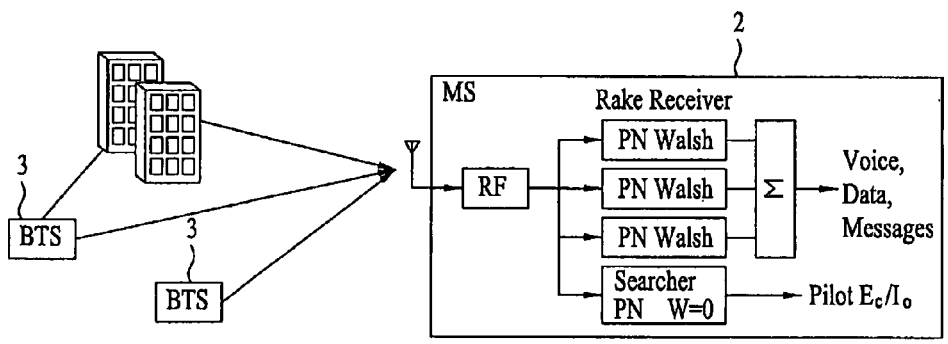
FIG. 4 illustrates a CDMA rake receiver.
Figure 5:
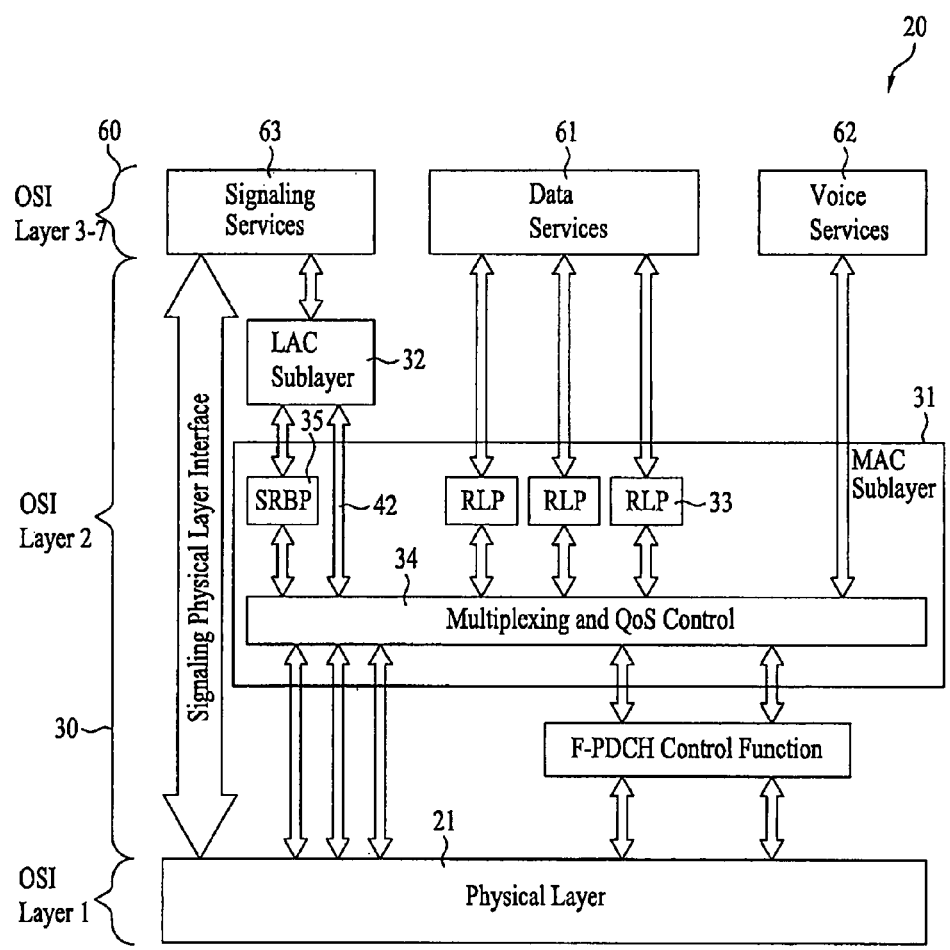
FIG. 5 illustrates a data link protocol architecture layer for a cdma2000 wireless network.
Figure 6:
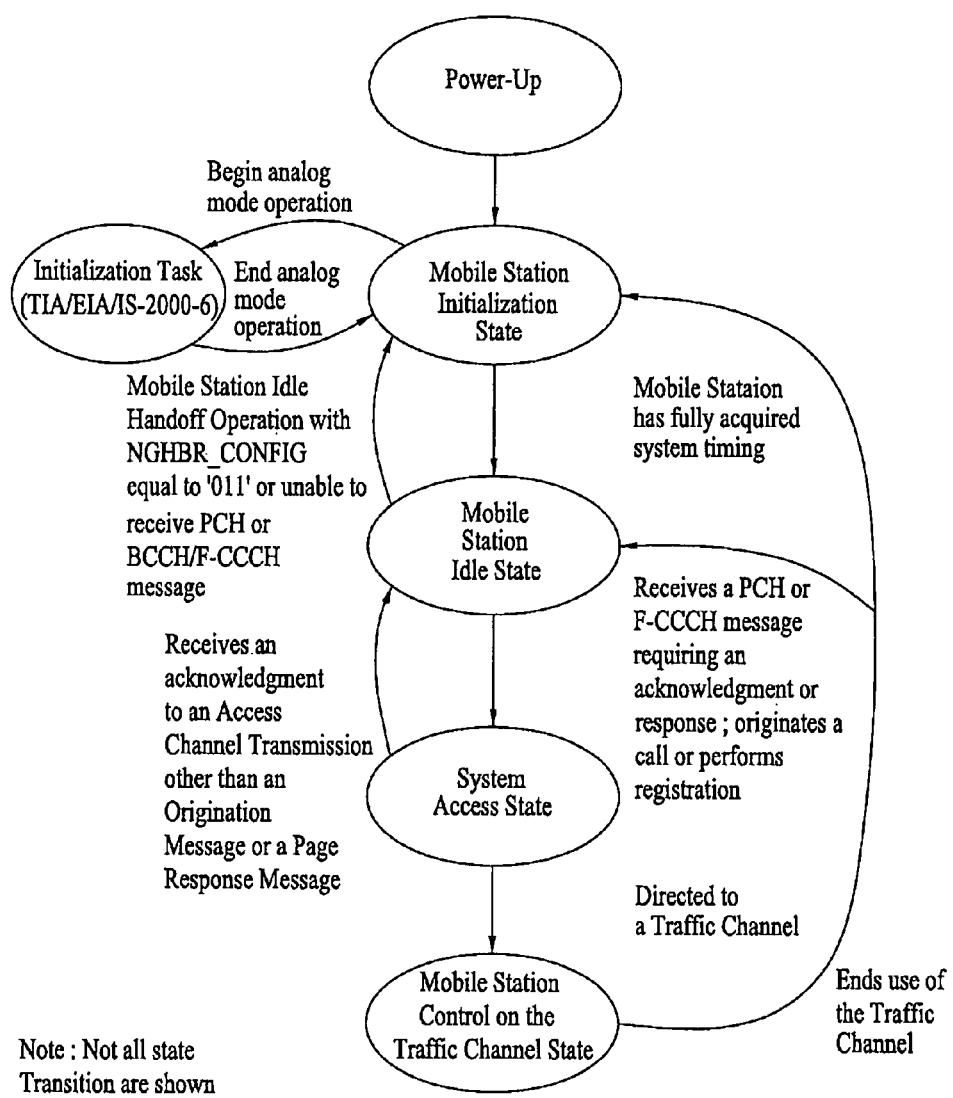
FIG. 6 illustrates cdma2000 call processing.
Figure 7:
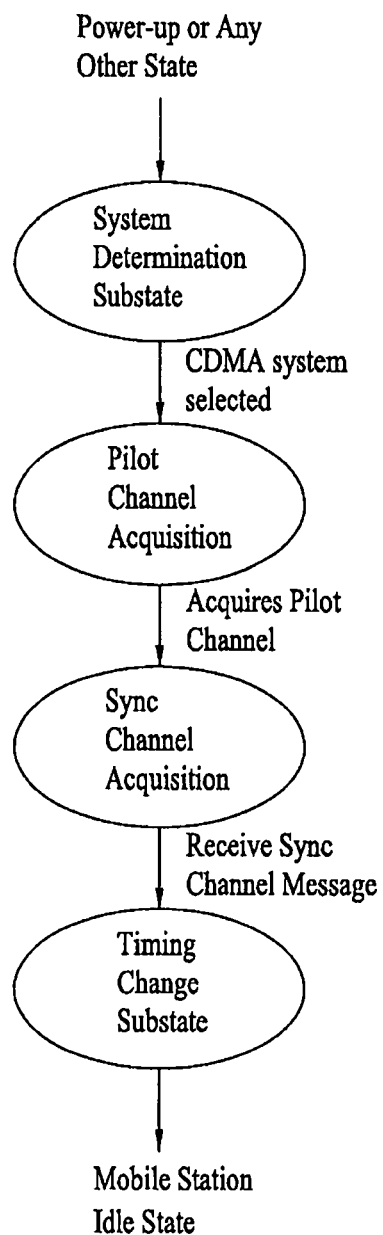
FIG. 7 illustrates the cdma2000 initialization state.
Figure 8:
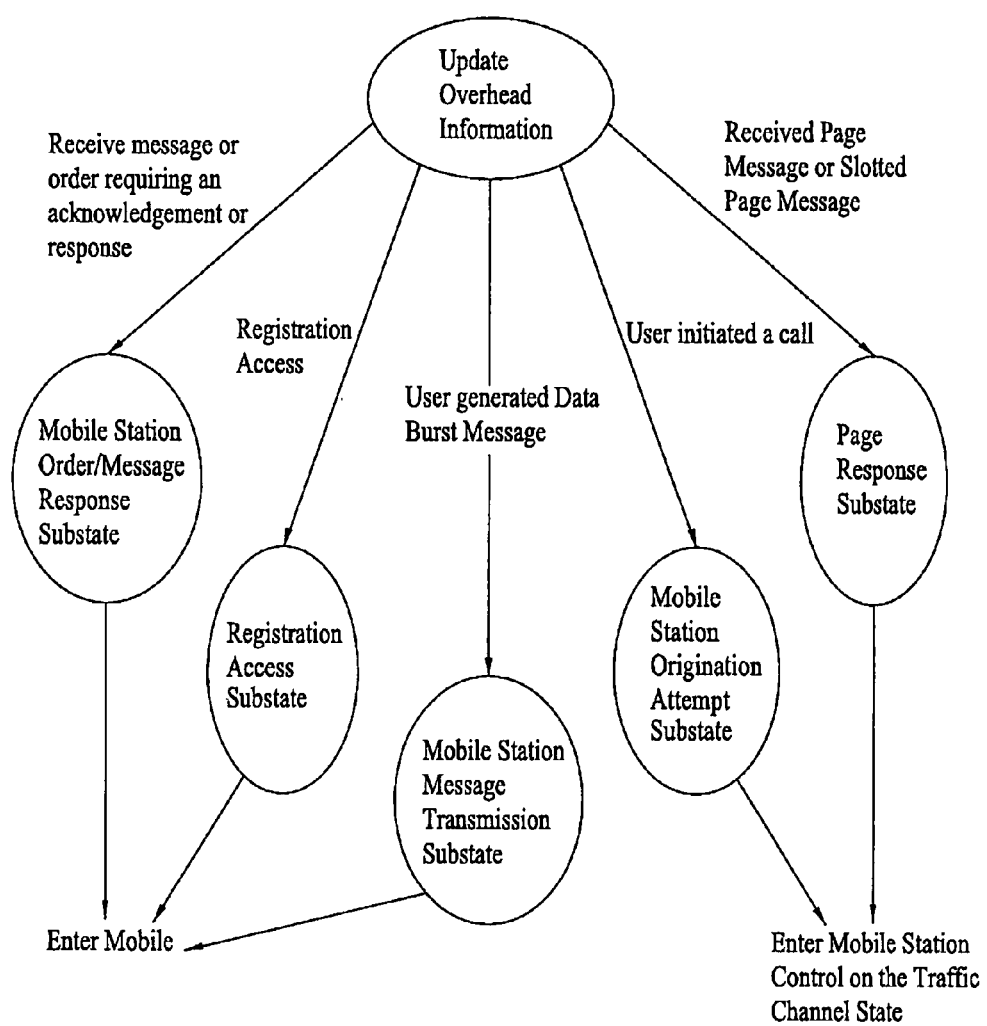
FIG. 8 illustrates the cdma2000 system access state.
Figure 9:
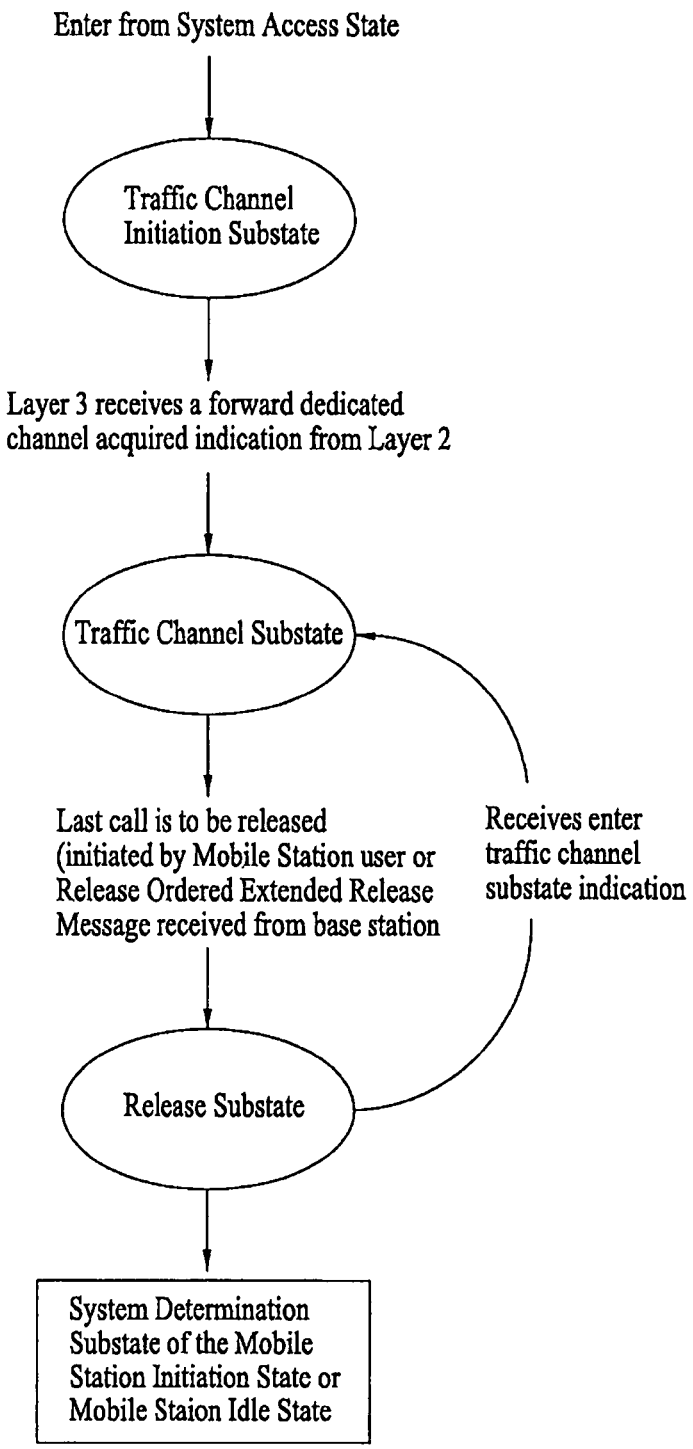
FIG. 9 illustrates the cdma2000 mobile traffic channel state.
Figure 10:
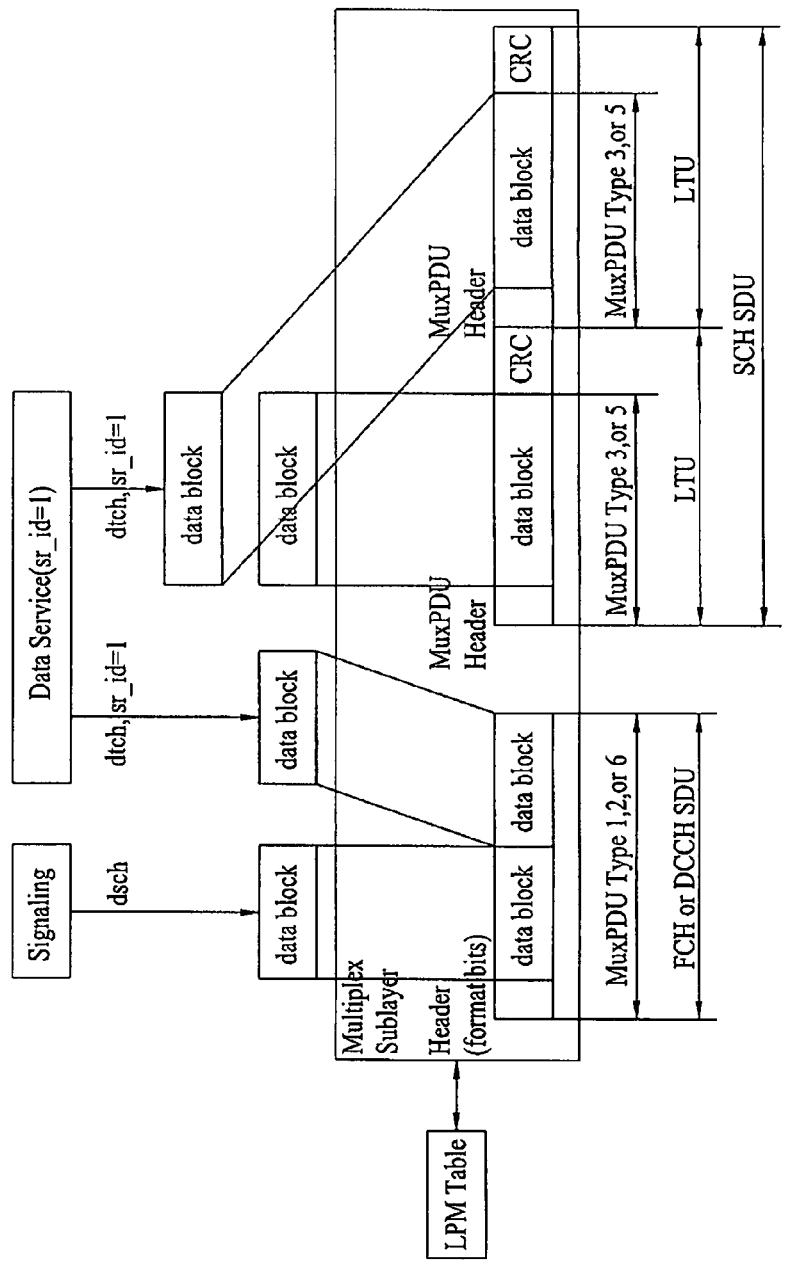
FIG. 10 illustrates the cdma2000 multiplex and QoS sublayer transmitting function.
Figure 12:
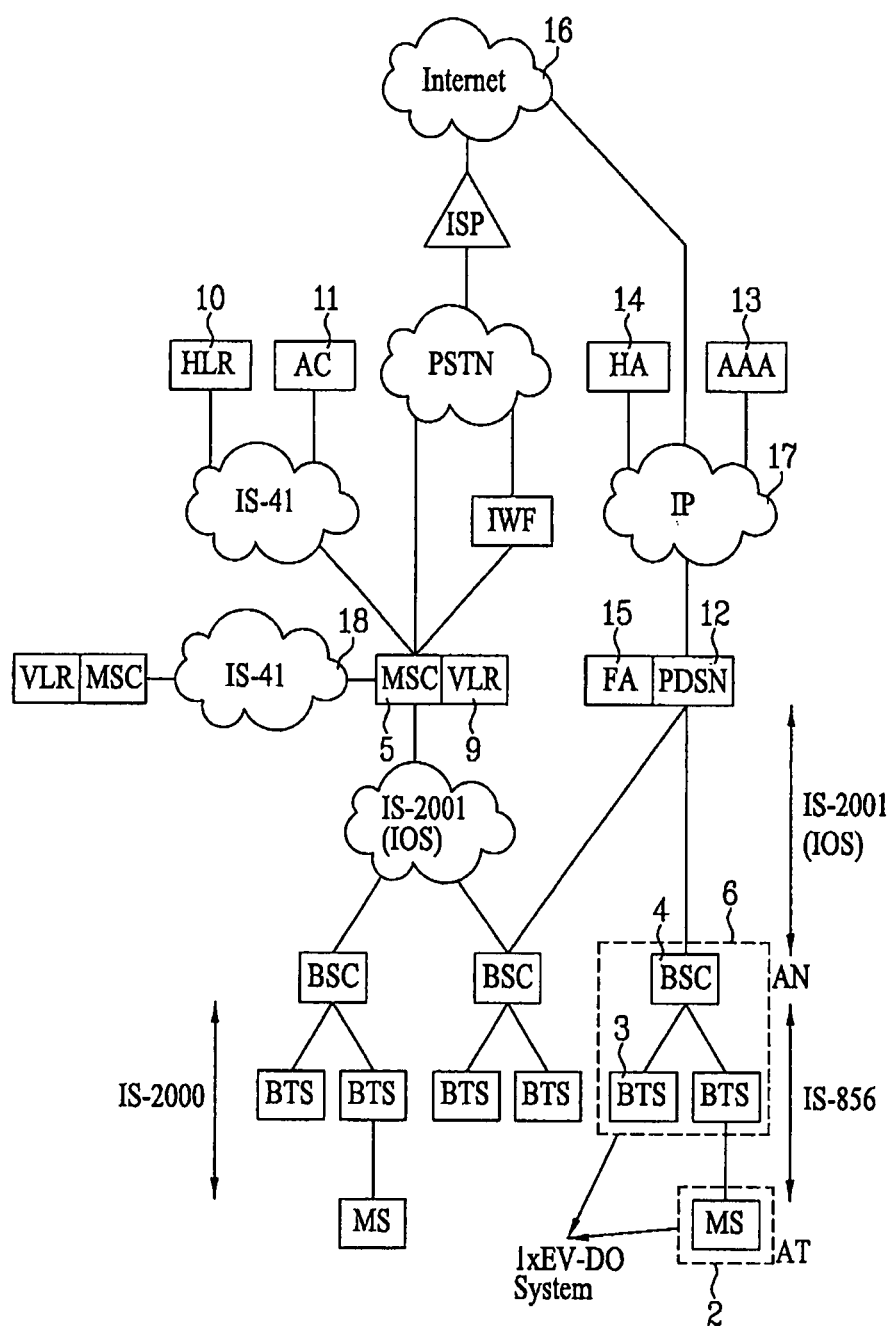
FIG. 12 illustrates a network architecture layer for a 1xEV-DO wireless network.
Figure 13:
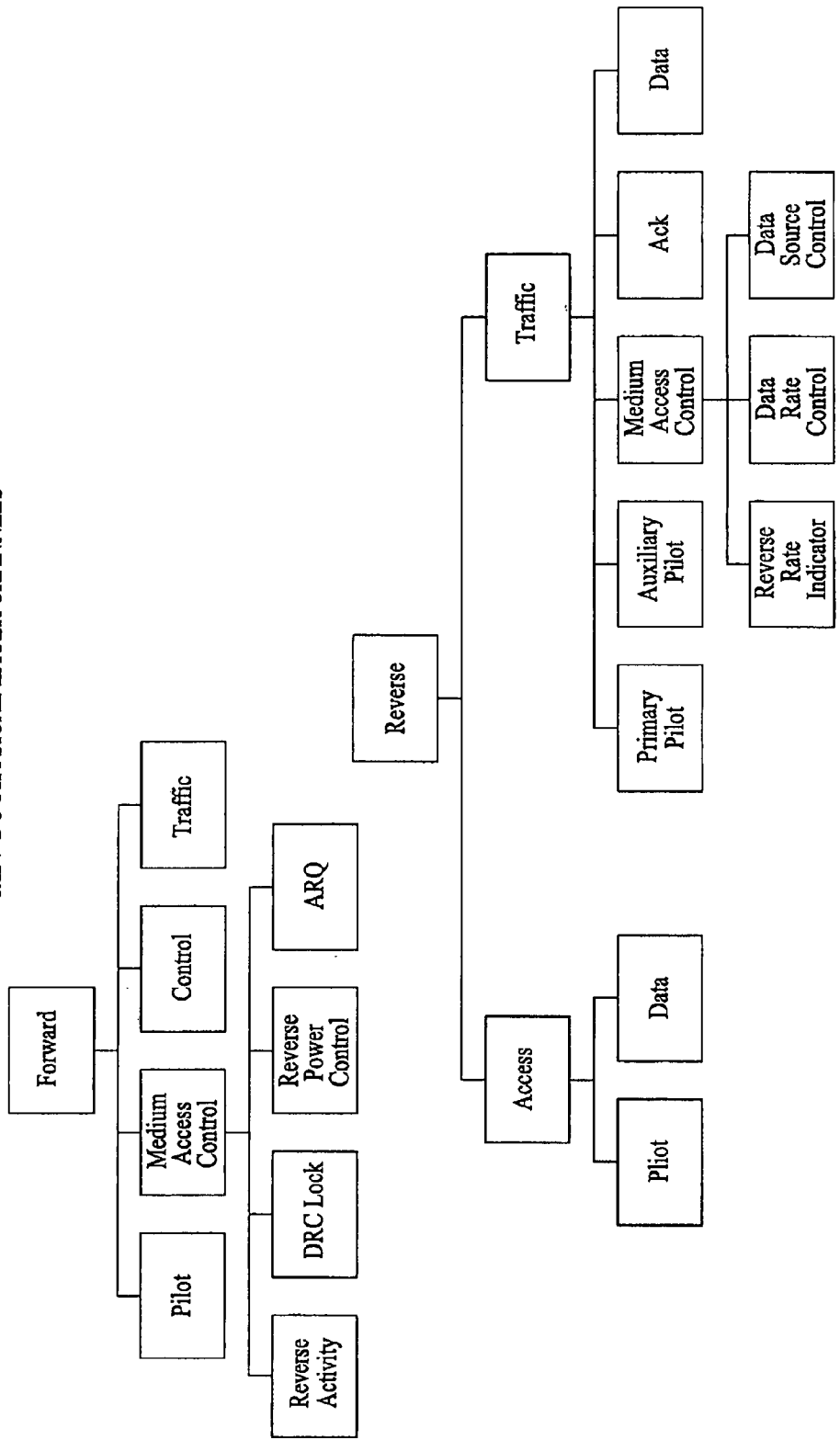
FIG. 13 illustrates 1xEV-DO physical layer channels.
Figure 14:
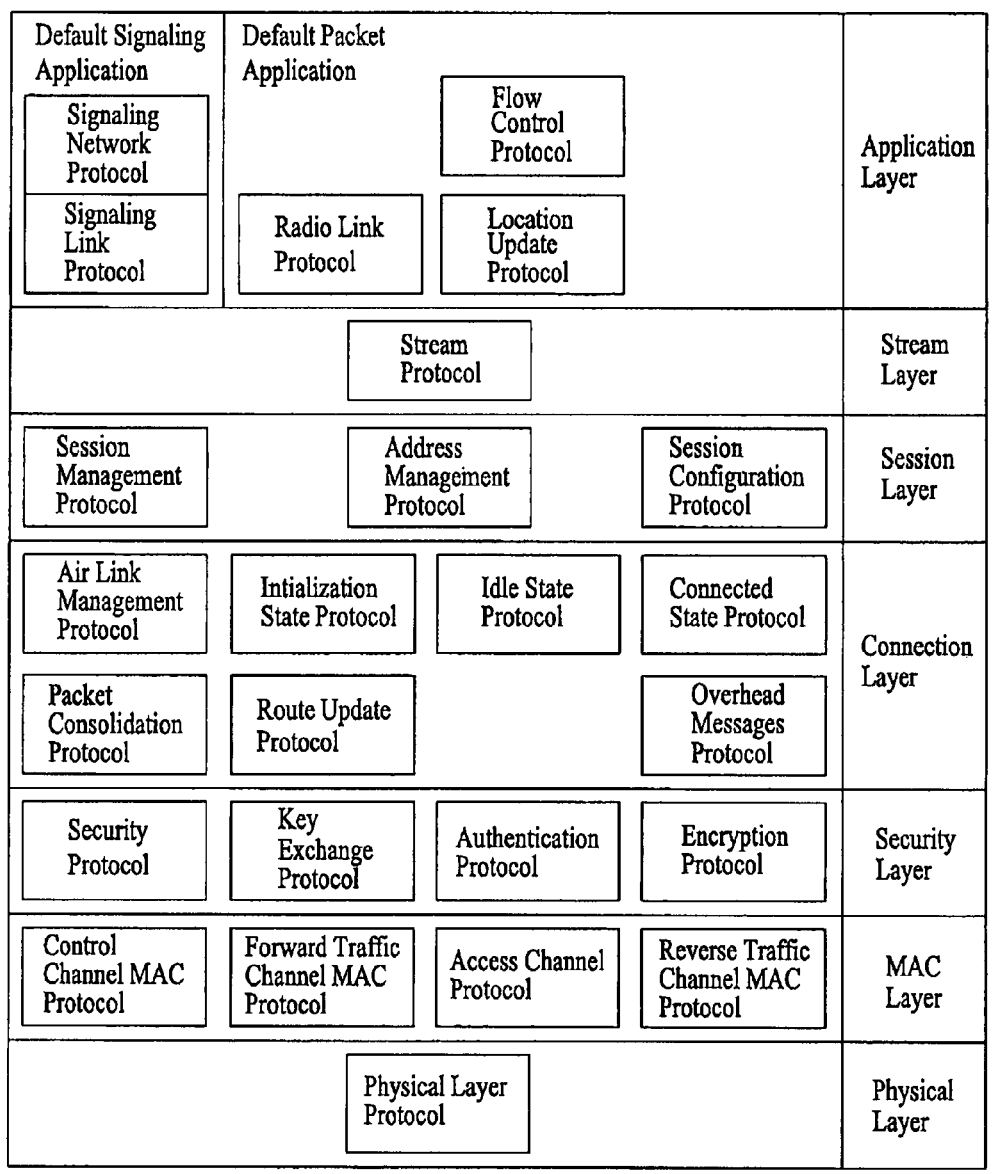
FIG. 14 illustrates 1xEV-DO default protocol architecture.
Figure 15:
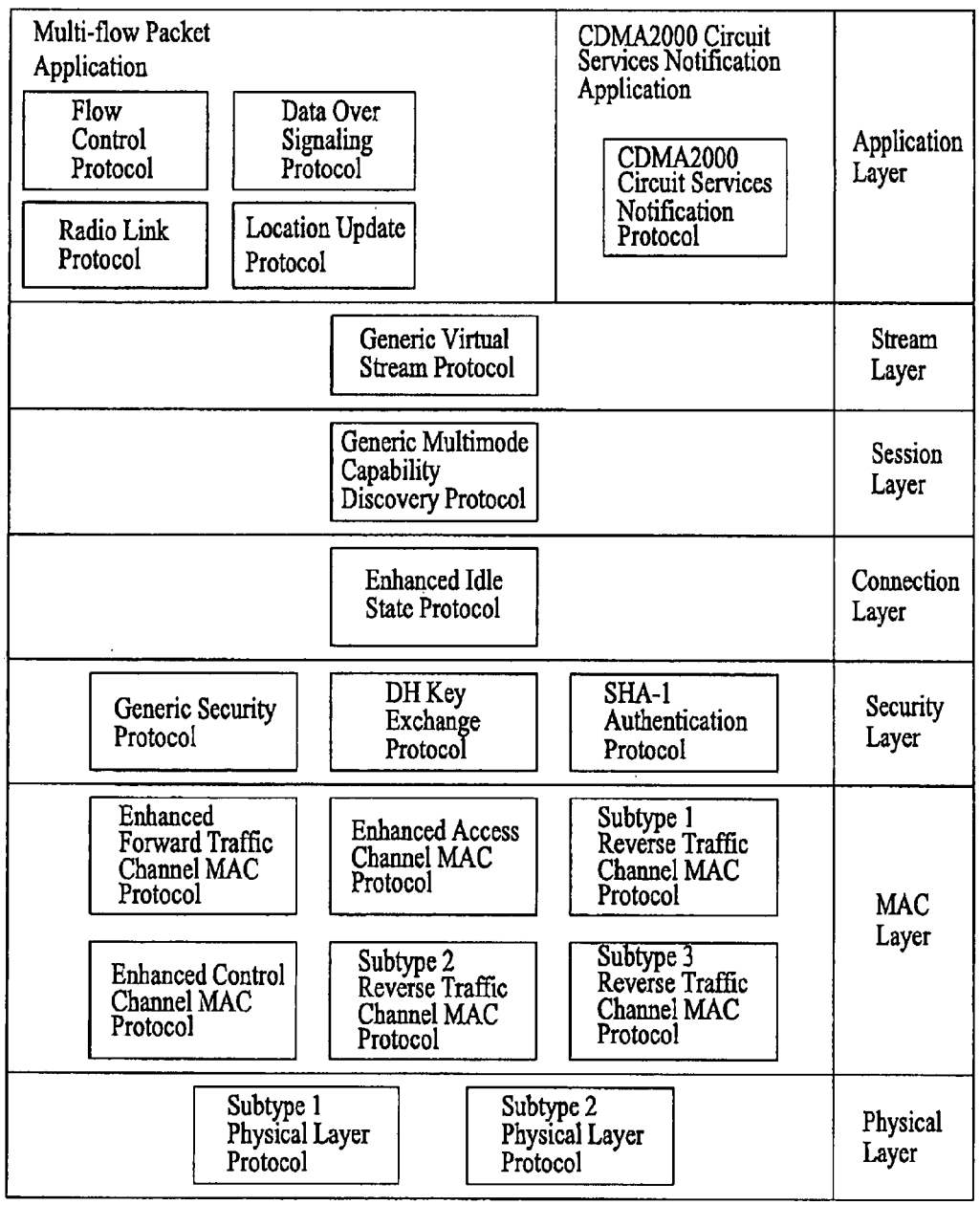
FIG. 15 illustrates 1xEV-DO non-default protocol architecture.
Figure 16:
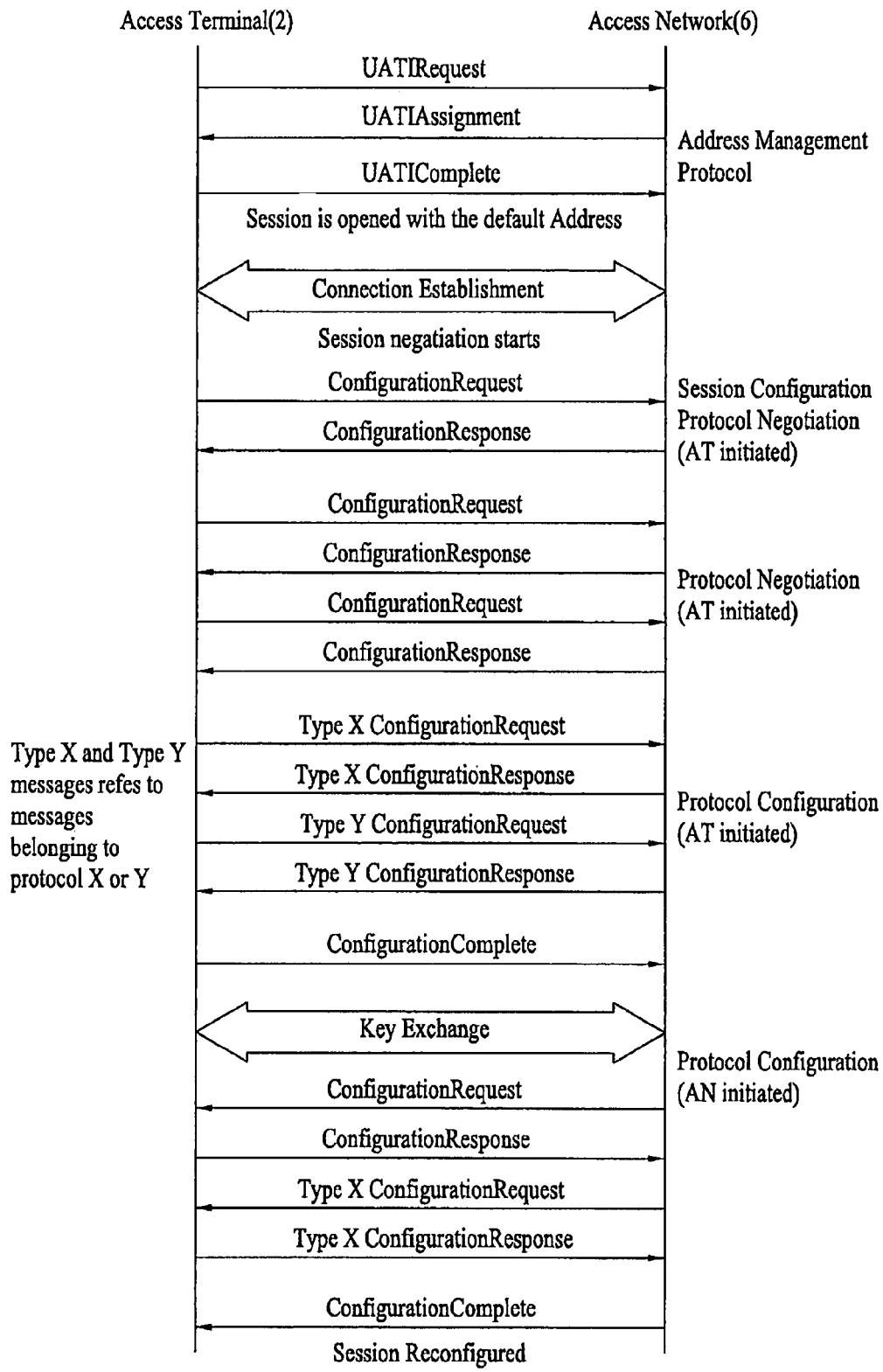
FIG. 16 illustrates 1xEV-DO session establishment.
Figure 17:
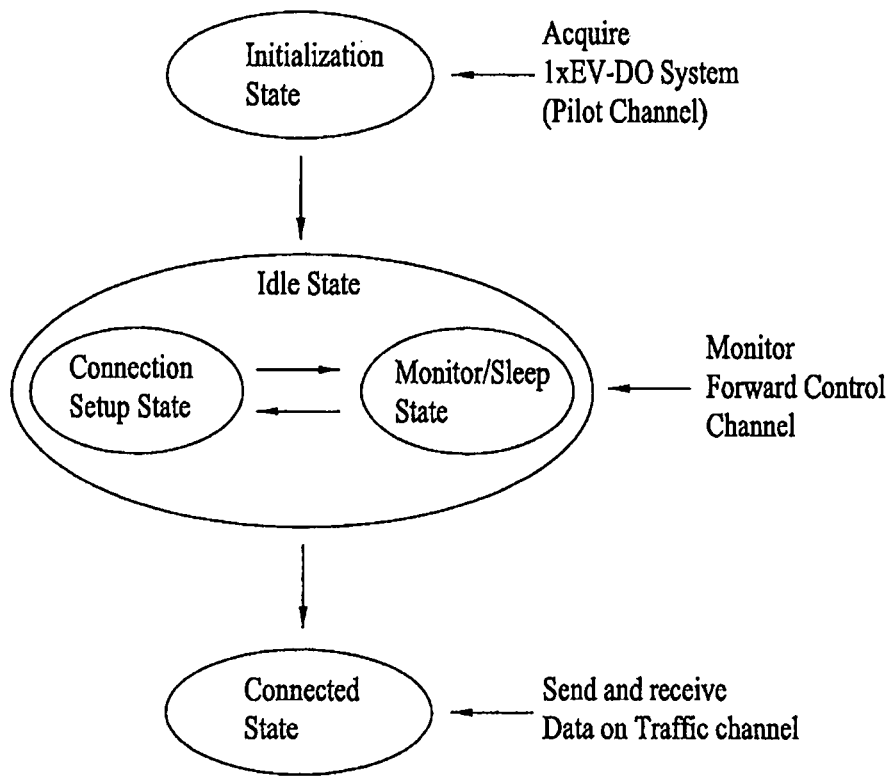
FIG. 17 illustrates 1xEV-DO connection layer protocols.
Figure 18:
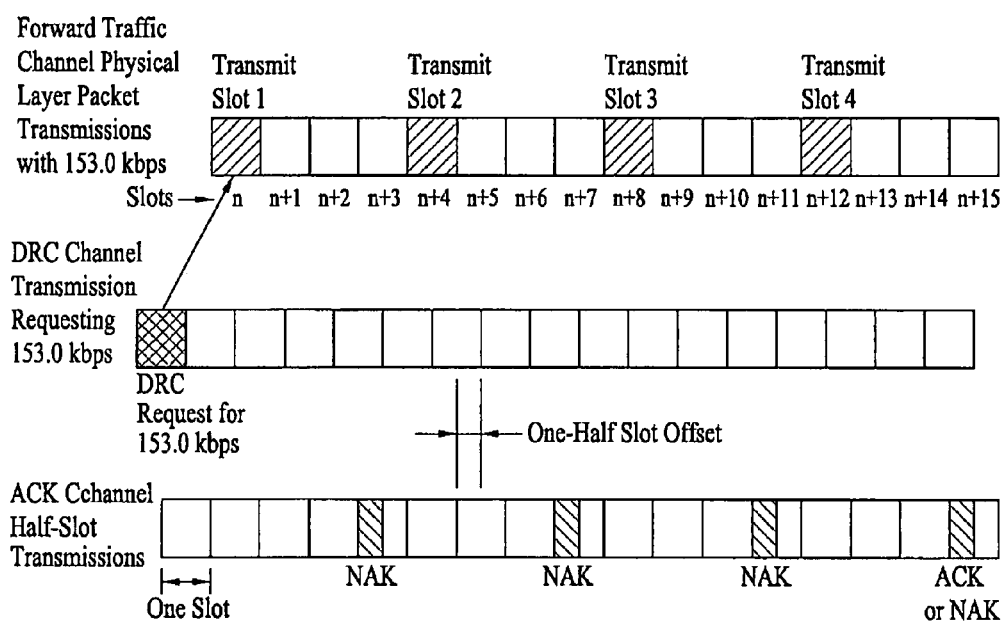
FIG. 18 illustrates 1xEV-DO ACK/NAK operation.

Reference will now be made in detail to the preferred embodiments of the present invention, examples of which are illustrated in the accompanying drawings. The invention is directed to transmission to support various traffic QoS requirements and various channel conditions by creating a flexible discrete-tone based air-interface which can support variable QoS traffic requirements and variable channel conditions.

In one embodiment of to the invention, time-frequency resources are partitioned into multiple groups. Each group includes a set of discrete tones that may or may not be connected in the time-frequency plane. A group can assume one of the discrete-tone based multiple access schemes.

The partitioning can be achieved in a number of ways. Frequency-wise partitioning may be achieved using contiguous groups, non-contiguous groups with interlacing or some combination of contiguous and non-contiguous groups. Time-wise partitioning may be achieved using contiguous groups, non-contiguous groups with interlacing or some combination of contiguous and non-contiguous groups. Generalized time-frequency partitioning may be achieved using any combination frequency-wise partitioning and time-wise partitioning.

In order to simplify the disclosure of the invention, embodiments will be described with regard to OFDM and MC-CDMA. However, it should be understood that OFDMA can be substituted for OFDM and that Single-carrier FDMA can be substituted for MC-CDMA.

For example, a system may have two groups, one group using OFDM and another group using MC-CDMA. Voice Over Internet Protocol (VoIP) users could be allocated to the MC-CDMA group whereas the web-browsing users could be allocated to the OFDM group.

The partitioning can also be varied with time as the users depart and arrive into the system. For example, more of the bandwidth (time and/or frequency) could be allocated to VoIP when the users are predominantly using VoIP. On the other hand, more of the bandwidth (time and/or frequency) could be allocated to OFDM when the users are predominantly using OFDM.

In a cellular environment, the partitioning can also be synchronized among the base-stations and sectors or can be done independently. Same-tone soft-hand-off (SHO) can be implemented If synchronized and using universal frequency re-use (single frequency networks), whereby multiple sectors and/or base stations can transmit the same information, which may or may not be encoded differently. Different-tone SHO can be implemented for non-universal frequency re-use systems, where the same information is transmitted over different tones from different transmitters.

Variable partitioning may be performed among sectors according to traffic requirements. The partitioning would be indicated by a broadcast message transmitted either periodically or as the partitioning changes. The broadcast message may be an upper layer message for in-band or a MAC message.

The length of the MC-CDMA code can vary since the amount of resources and number of MC-CDMA users may vary. For example, MC-CDMA may use length-64 codes, such as the Walsh-Hadamard codes, when the amount of resources is large. On the other hand, length 8 sequences may be used when the amount of resources is small. Preferably, Walsh-Hadamard codes with lengths in multiples of discrete tones, such as 1, 2, 4, 8, 16 and 32, are used.

Typically, MC-CDMA is restricted to the same time-slot, such as a 16-length Walsh code using 16 tones in one time-slot. The MC-CDMA codes may also be distributed in the time domain, such as 16 length Walsh codes using 4 tones in one time-slot and another 4 tones in a different time-slot.

Multiple MC-CDMA groups may be used. However a single MC-CDMA group is preferably used in order to maximize multiplexing gains with voice-activity.

Multiple transmission antennas may be used when there are multiple antennas. This creates a third dimension to the partitioning in that the partitioning can be further generalized over the time, frequency and antenna (space) domains. Partitions may be consistent or different over the antennas.

A plurality of multiplexing techniques or multiple access techniques may be used. For example, OFDM users may use rate-control, or link adaptation, using channel quality information (CQI) feedback. On the other hand, MC-CDMA users may use power control, such that the power level per user can be adjusted individually in the same manner as in IS-2000 1xRTT using either CQI or more coarse feedback, such as a power control bit command.

Power control may be performed with a single power control command bit on the feedback link or with multiple commands, such that there is one command for each transmitter or sector. MC-CDMA users close to the base station would need less power while users further way would require more power.

The MC-CDMA may designed to accommodate various voice-activities since the voice frame may be at ⅛th (or null), ¼, ½ or a full rate voice frame. For example, the existing IS-2000 with length 64 codes could be used. Furthermore, existing IS-2000 could be adjusted to smaller or larger code lengths as the traffic requirements change.

Different sectors may transmit the same information over the same MC-CDMA group or different groups. Likewise for OFDM, multi-site diversity with sector switching is possible.

Both MC-CDMA and OFDM may support an automatic repeat request (ARQ) scheme. For example, all the MC-CDMA users in cdma2000 Rev. C, can be set to re-transmit twice given the 1.666 msec slot or a configurable number of times in one interlace such that they transmit once every four time slots.

The re-transmission instants are preset in order to allow for soft-combining when multiple sector transmitters are used. For example, three consecutive slots in one interlace that covers a span of 20 msec would allow a maximum of two sub-packet re-transmissions.

A terminal sends an acknowledgment (ACK) when it correctly decodes the packet. Sectors that decode the ACK can then stop transmitting. Sectors that fail to decode the ACK can re-transmit.

The MC-CDMA users can be staggered such that the transmission time of the first sub-packets among users are evenly distributed in the time-domain. In this way, the resources can be allocated evenly. For example, more resources are available at later sub-packet re-transmissions with MC-CDMA since VoIP users may terminate early where an ACK is received early. It is also possible to align all the initial MC-CDMA sub-packets.

Although the disclosure herein applies primarily to the forward link of cellular communication systems, the disclosure is also applicable to reverse links. Furthermore, the disclosure may also be applied to single-link systems, such as broadcast and multi-cast. Moreover, the disclosure is also applicable to TDD systems.

FIGS. 19-23 illustrate sample partitions for a system having 16 tones and 8 time slots, or 8 symbols per row. The x-axis represents time and the y-axis represents frequency. Each cell represents a discrete-tone symbol.

Figure 19:
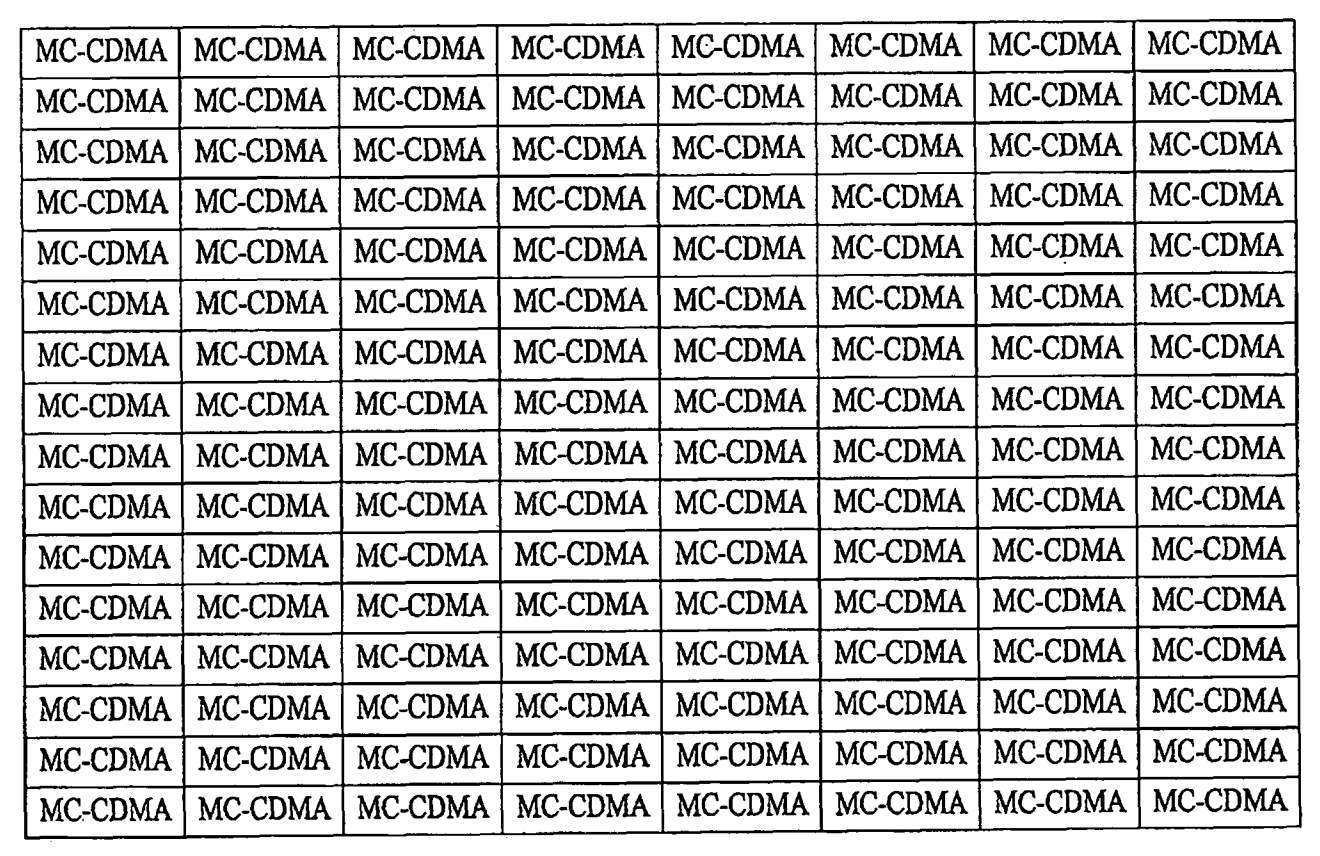

FIG. 19 illustrates all MC-CDMA traffic. FIG. 20 illustrates all OFDM traffic. FIG. 21 illustrates an even mix of VoIP and web-browsing traffic partitioned only in the frequency domain. FIG. 22 illustrates light VoIP traffic and more web-browsing traffic partitioned only in the frequency domain. FIG. 23 illustrates a low number of VoIP users partitioned in both the time and frequency domain.

Figure 24:
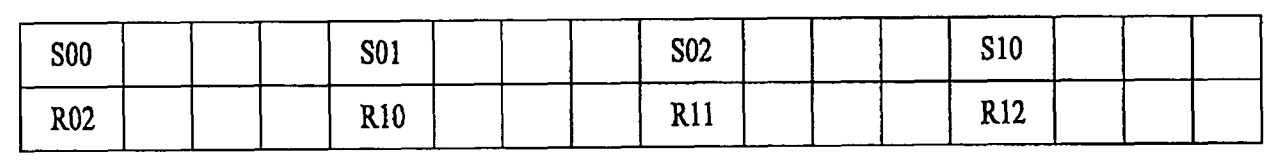

FIG. 24 illustrates ARQ operation for MC-CDMA with two VoIP users 'S' and 'R'. The x-axis represents time. The y-axis represents power allocation for two users. The symbol 'SIk' denotes packet number 'I', sub-packet transmission number 'k' for user 'S.' Similarly for user 'R,' whereby user 'R's initial sub-packet is offset by four time slots and user 'R' has twice as much transmission power as user 'S'.

In another embodiment of the invention, a mechanism for fast cell switching is provided for circuit-switched type traffic, such as voice traffic or control signaling, in order to take advantage of spatial diversity in a timely manner. The BSC 4 delivers identical packets with a predetermined transmission format to BTS's 3 involved in a handoff.

A separate data rate control (DRC) channel, which carries pilot cover and power control bits, is provided for VoIP flows. MC-CDMA slots are synchronized between BTS's 3, with the DRC cover transmitted from an AT 2 to a BTS 3 determining which BTS is the serving BTS.

The BTS 3 pilot to which the DRC cover points serves the packet. The BTS 3 pilot to which the DRC cover does not point drops the packet. The result is basically a form of smart selective transmission and reduces the amount of interference generated since there are less over-the-air signals.

The boundary for changing the DRC cover must be set to be slight when H-ARQ is used. The DRC cover change can occur any time after the 1st sub packet transmission until before the next 1st sub packet time interval. For example, the DRC cover change may occur during the 3rd sub packet transmission instant when using the NxEV-DO slot timing, the H-ARQ timing structure and 20 msec as the allowable over the air delay.

The 1st sub-packet instant may vary among the users in order to ensure a nice distribution of the circuit switched H-ARQ transmissions. For example, the network may incorporate a mechanism to offset the 1st sub-packet instant with voice traffic.

The network may send such information with control signaling or upper layer messaging. By offsetting the $1^{st}$ sub-packet, it can be ensured that sub-packets are always being sent to some AT's 2 even if ACK has been received for packets to the same AT's.

Figure 25:
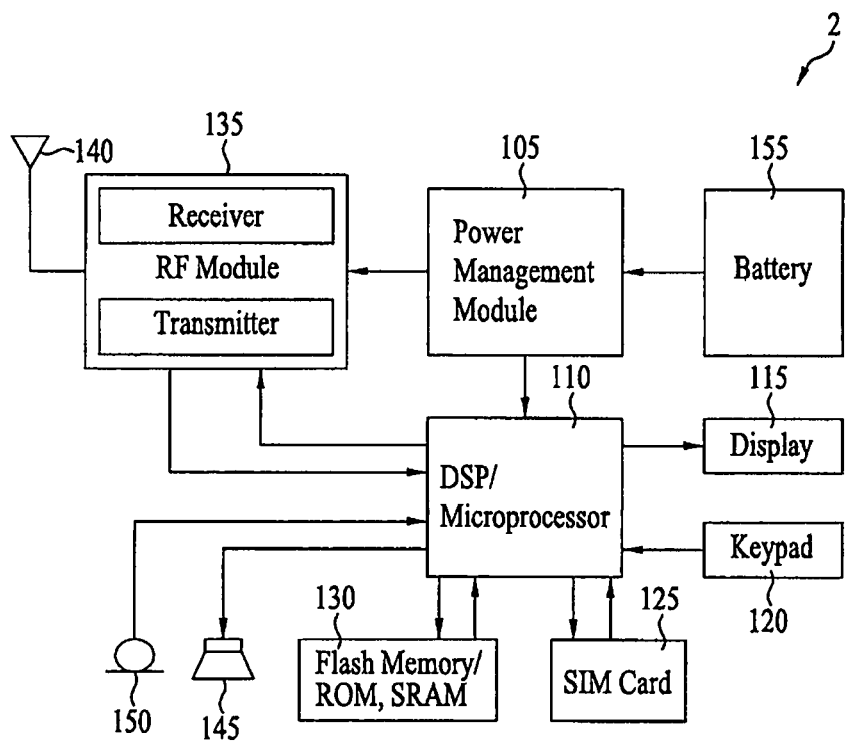
FIG. 25 illustrates a block diagram of a mobile station or access terminal.

FIG. 25 illustrates a block diagram of a mobile station (MS) or access terminal 2. The AT 2 includes a processor (or digital signal processor) 110, RF module 135, power management module 105, antenna 140, battery 155, display 115, keypad 120, memory 130, SIM card 125 (which may be optional), speaker 145 and microphone 150.

A user enters instructional information, such as a telephone number, for example, by pushing the buttons of a keypad 120 or by voice activation using the microphone 150. The microprocessor 110 receives and processes the instructional information to perform the appropriate function, such as to dial the telephone number. Operational data may be retrieved from the Subscriber Identity Module (SIM) card 125 or the memory module 130 to perform the function. Furthermore, the processor 110 may display the instructional and operational information on the display 115 for the user's reference and convenience.

The processor 110 issues instructional information to the RF module 135, to initiate communication, for example, transmit radio signals comprising voice communication data. The RF module 135 comprises a receiver and a transmitter to receive and transmit radio signals. An antenna 140 facilitates the transmission and reception of radio signals. Upon receiving radio signals, the RF module 135 may forward and convert the signals to baseband frequency for processing by the processor 110. The processed signals would be transformed into audible or readable information outputted via the speaker 145, for example. The processor 110 also includes the protocols and functions necessary to perform the various processes described herein with regard to cdma2000 or 1xEV-DO systems.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

The foregoing embodiments and advantages are merely exemplary and are not to be construed as limiting the present invention. The present teaching can be readily applied to other apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method for providing a plurality of users with a plurality of defined multiple access techniques in a multiple access mobile communication system with multiple transmission antennas, the mobile communication system utilizing discrete-tone symbols for transmission of signals, the method comprising:

determining requirements of the plurality of users;

assigning each of the plurality of users to at least one of the plurality of defined multiple access techniques;

grouping the discrete-tone symbols of a transmission frame into at least two groups according to the plurality of defined multiple access techniques;

partitioning a group of the discrete-tone symbols among the plurality of users according to the at least one of the plurality of defined multiple access techniques to which each of the plurality of users is assigned, wherein each of the discrete-tone symbols is a resource defined by three dimensions including a time domain, a frequency domain, and an antenna domain;

assigning each of the plurality of defined multiple access techniques to specific partitioned resources of the at least two groups, wherein partitioning the group of the discrete-tone symbols comprises allocating the specific partitioned resources of the at least two groups to the plurality of users, wherein partitioning the group of the discrete-tone symbols is performed according to requirements of each of the plurality of users, the requirements including at least power requirements, voice communication rate requirements, a number of the multiple transmission antennas, a latency requirement, traffic quality of service (QoS) requirements, or channel conditions, wherein, in each time slot of the transmission frame, the discrete-tone symbols of a first group of the at least two groups are distinguished from the discrete-tone symbols of a second group of the at least two groups in the frequency domain and the discrete-tone symbols of the first group are not distinguished from the discrete-tone symbols of the second group in the time domain, and wherein assigning each of the plurality of defined multiple access techniques to specific partitioned resources of the at least two groups includes:

assigning a first access technique to a first resource defined by a first time domain resource, a first frequency domain resource and a first antenna domain resource; and assigning a second access technique to a second resource defined by the first time domain resource, the first frequency domain resource and a second antenna domain resource.

2. The method of claim 1, further comprising synchronizing the partitioning of the group of the discrete-tone symbols among at least one of a plurality of base stations.

3. The method of claim 1, further comprising providing an indication of the partitioning of the group of the discrete-tone symbols to the plurality of users via a broadcast message either periodically or upon changing the partitioning of the group of the discrete-tone symbols.

4. The method of claim 1, further comprising varying a length of a spreading code according to a number of the plurality of users assigned to each of the plurality of defined multiple access techniques that is multi-carrier code division multiple access (MC-CDMA).

5. The method of claim 1, wherein:

partitioning the group of the discrete-tone symbols further comprises by delaying a transmission of a first sub packet of a first data packet to at least one of the plurality of users relative to a transmission of a first sub packet of a second data packet to at least another one of the plurality of users; and an automatic repeat request (ARQ) scheme is supported.

6. The method of claim 1, wherein partitioning the group of the discrete-tone symbols is consistent over the multiple transmission antennas.

7. The method of claim 1, wherein partitioning the group of the discrete-tone symbols is different over the multiple transmission antennas.

8. A multiple access mobile communication system, with multiple transmission antennas, utilizing discrete-tone symbols for transmission of signals for providing a plurality of users with a plurality of defined multiple access techniques, the system comprising:

a network configured to:

determine communication requirements of the plurality of users;

assign each of the plurality of users to at least one of the plurality of defined multiple access techniques;

group the discrete-tone symbols of a transmission frame into at least two groups according to the plurality of defined multiple access techniques; and partition a group of the discrete-tone symbols of the transmission frame among the plurality of users according to the at least one of the plurality of defined multiple access techniques to which each of the plurality of users is assigned, wherein each of the discrete-tone symbols is a resource defined by three dimensions including a time domain, a frequency domain, and an antenna domain; and assign each of the plurality of defined multiple access techniques to specific partitioned resources of the at least two groups within each time slot of the transmission frame, wherein the network is further configured to partition the group of discrete-tone symbols by allocating the specific partitioned resources of the at least two groups to the plurality of users, wherein the network is further configured to partition the group of discrete-tone symbols according to requirements of each of the plurality of users, the requirements including at least voice communication rate requirements, a number of the multiple transmission antennas, a latency requirement, traffic quality of service (QoS) requirements, or channel conditions, wherein, in each time slot of the transmission frame, the discrete-tone symbols of a first group of the at least two groups are distinguished from the discrete-tone symbols of a second group of the at least two groups in the frequency domain and the discrete-tone symbols of the first group are not distinguished from the discrete-tone symbols of the second group in the time domain, and wherein the assignment of each of the plurality of defined multiple access techniques to specific partitioned resources of the at least two groups includes:

assigning a first access technique to a first resource defined by a first time domain resource, a first frequency domain resource and a first antenna domain resource; and assigning a second access technique to a second resource defined by the first time domain resource, the first frequency domain resource and a second antenna domain resource.

9. The system of claim 8, wherein the partitioning of the group of the discrete-tone symbols is synchronized among at least one of a plurality of base stations.

10. The system of claim 8, wherein the network is further configured to provide an indication of the partitioning of the group of the discrete-tone symbols to the plurality of users via a broadcast message either periodically or upon changing the partitioning of the group of the discrete-tone symbols.

11. The system of claim 8, wherein the network is further configured to vary a length of a spreading code according to a number of the plurality of users assigned to each of the plurality of defined multiple access techniques that is multi-carrier code division multiple access (MC-CDMA).

12. The system of claim 8, wherein the network is further configured to:

partition the group of the discrete-tone symbols among the plurality of users by delaying a transmission of a first sub packet of a first data packet to at least one of the plurality of users relative to a transmission of a first sub packet of a second data packet to at least another one of the plurality of users; and support an automatic repeat request (ARQ) scheme.

13. The system of claim 8, wherein partitioning the group of the discrete-tone symbols is consistent over the multiple transmission antennas.

14. The system of claim 8, wherein partitioning the group of the discrete-tone symbols is different over the multiple transmission antennas.

* * * * *